United States Patent
Sakai et al.

(10) Patent No.: US 11,772,612 B2
(45) Date of Patent: Oct. 3, 2023

(54) VEHICLE CLEANER SYSTEM AND VEHICLE SYSTEM

(71) Applicant: KOITO MANUFACTURING CO., LTD., Tokyo (JP)

(72) Inventors: Masaru Sakai, Shizuoka (JP); Kazuki Kawamura, Shizuoka (JP); Akinobu Kubota, Shizuoka (JP); Masaaki Sato, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/977,575

(22) PCT Filed: Mar. 4, 2019

(86) PCT No.: PCT/JP2019/008282
§ 371 (c)(1),
(2) Date: Sep. 2, 2020

(87) PCT Pub. No.: WO2019/172159
PCT Pub. Date: Sep. 12, 2019

(65) Prior Publication Data
US 2020/0406864 A1    Dec. 31, 2020

(30) Foreign Application Priority Data

Mar. 7, 2018 (JP) ................................ 2018-041032
Mar. 7, 2018 (JP) ................................ 2018-041036
(Continued)

(51) Int. Cl.
*B60S 1/56* (2006.01)
*B60S 1/52* (2006.01)
(Continued)

(52) U.S. Cl.
CPC . *B60S 1/56* (2013.01); *B60S 1/52* (2013.01); *B60S 1/54* (2013.01); *G07C 5/0825* (2013.01);
(Continued)

(58) Field of Classification Search
None
See application file for complete search history.

(56) References Cited

U.S. PATENT DOCUMENTS

2011/0073142 A1   3/2011  Hattori et al.
2013/0092758 A1   4/2013  Tanaka et al.
(Continued)

FOREIGN PATENT DOCUMENTS

CN   103043035 A   4/2013
CN   205668553 U   11/2016
(Continued)

OTHER PUBLICATIONS

Dedicated Short Range Communications (DSRC) Service, 2017, Federal Communications Commission (Year: 2017).*
(Continued)

*Primary Examiner* — Spencer E. Bell
*Assistant Examiner* — Omair Chaudhri
(74) *Attorney, Agent, or Firm* — Sughrue Mion, PLLC

(57) ABSTRACT

A vehicle cleaner system includes: a cleaner unit mounted on a vehicle and configured to clean an external sensor acquiring information on outside of the vehicle; an advanced notification information acquiring unit configured to acquire expressway advanced notification information notifying that the vehicle has arrived within a predetermined distance from an entrance of an expressway; and a cleaner control unit configured to, when the advanced notification information acquiring unit has acquired the expressway advanced notification information, control the cleaner unit to clean the
(Continued)

external sensor or diagnose whether or not the external sensor needs to be cleaned by the cleaner unit.

6 Claims, 18 Drawing Sheets

(30) Foreign Application Priority Data

Mar. 7, 2018 (JP) .................................. 2018-041037
Mar. 7, 2018 (JP) .................................. 2018-041038

(51) Int. Cl.
*B60S 1/54* (2006.01)
*G07C 5/08* (2006.01)
*G05D 1/00* (2006.01)
*G08G 1/0969* (2006.01)

(52) U.S. Cl.
CPC ......... *G05D 1/0061* (2013.01); *G08G 1/0969* (2013.01)

(56) References Cited

U.S. PATENT DOCUMENTS

| | | | |
|---|---|---|---|
| 2014/0217194 A1* | 8/2014 | Han | B60S 1/56 239/284.1 |
| 2015/0032292 A1* | 1/2015 | Stratton | B60S 1/0848 701/2 |
| 2015/0203077 A1 | 7/2015 | Gokan | |
| 2016/0229378 A1* | 8/2016 | Kowalk | B60S 1/68 |
| 2016/0282865 A1 | 9/2016 | Shimizu et al. | |
| 2017/0297536 A1* | 10/2017 | Giraud | G02B 27/0006 |
| 2017/0313288 A1* | 11/2017 | Tippy | B60R 1/0602 |
| 2018/0009418 A1 | 1/2018 | Newman | |
| 2019/0106085 A1* | 4/2019 | Bacchus | B60S 1/62 |
| 2019/0256054 A1* | 8/2019 | Turner | G01N 21/15 |
| 2020/0094784 A1* | 3/2020 | Herman | G06K 9/6271 |
| 2020/0110407 A1* | 4/2020 | Miura | B60S 1/56 |
| 2020/0391702 A1* | 12/2020 | Yamauchi | B60S 1/56 |
| 2021/0197769 A1* | 7/2021 | Shirakura | B60S 1/56 |

FOREIGN PATENT DOCUMENTS

| | | |
|---|---|---|
| CN | 106394513 A | 2/2017 |
| EP | 3 396 938 A1 | 10/2018 |
| JP | 2001-171491 A | 6/2001 |
| JP | 2001-281327 A | 10/2001 |
| JP | 2007-189369 A | 7/2007 |
| JP | 2011-240916 A | 12/2011 |
| JP | 2016-187990 A | 11/2016 |
| JP | 2017-3541 A | 1/2017 |
| JP | 2018-47878 A | 3/2018 |
| WO | 2017/110628 A1 | 6/2017 |

OTHER PUBLICATIONS

International Search Report dated May 14, 2019 (PCT/ISA/210) issued by the International Searching Authority for International Application No. PCT/JP2019/008282.
Written Opinion dated May 14, 2019 (PCT/ISA/237) issued by the International Searching Authority for International Application No. PCT/JP2019/008282.
Communication dated Jul. 20, 2023, issued by the Chinese Patent Office in Chinese Application No. 201980017683.2.

* cited by examiner

VEHICLE CLEANER SYSTEM AND VEHICLE SYSTEM

CROSS-REFERENCE TO RELATED APPLICATIONS

This application is a National Phase Entry of PCT International Application No. PCT/JP2019/008282, filed on Mar. 4, 2019, which claims priority to Japanese Patent Application No. 2018-41032 filed on Mar. 7, 2018, Japanese Patent Application No. 2018-41036 filed on Mar. 7, 2018, Japanese Patent Application No. 2018-41037 filed on Mar. 7, 2018, Japanese Patent Application No. 2018-41038 filed on Mar. 7, 2018.

TECHNICAL FIELD

The present invention relates to a vehicle cleaner system and a vehicle system.

BACKGROUND ART

A vehicle cleaner that discharges a cleaning liquid to a sensor or the like mounted on a vehicle is known in Patent Literature 1 or the like.

CITATION LIST

Patent Literature

Patent Literature 1: JP-A-2016-187990

SUMMARY OF INVENTION

Technical Problem

In a case where a vehicle travels on an expressway such as a highway, a speed of the vehicle is larger than that in a case where the vehicle travels on a general road that is not an expressway. Therefore, in the case where the vehicle travels on the expressway, the sensor is required to more accurately and quickly sense an object that is farther away from the vehicle as compared with the case where the vehicle travels on the general road. That is, in the case where the vehicle travels on the expressway, sensitivity of the sensor is required to be high.

The present inventors have found that it is preferable to keep a sensor in a clean state before entering an expressway.

Therefore an object of the present invention is to provide a vehicle cleaner system that can clean a sensor by a vehicle cleaner before entering an expressway.

Further, in a vehicle having a vehicle control unit capable of executing an automatic driving mode, it is necessary to rapidly process a sensor signal output from a camera or the like. When the vehicle control unit executes the automatic driving mode, the vehicle control unit recognizes another vehicle, a pedestrian, a fallen object, a wall, or the like according to the sensor signal, and controls traveling of the vehicle. In a case where the vehicle moves at high speed, it is particularly necessary to process the sensor signal rapidly. Therefore, the sensor needs to transmit information acquired by a sensor element to the vehicle control unit without delay. The sensor includes a sensor signal processing unit that processes an output of the sensor element into a sensor signal in a format suitable for the vehicle control unit and outputs the sensor signal to the vehicle control unit.

On the other hand, it is known to determine from the output of the sensor whether or not the sensor is dirty. For example, in a case where a pixel in a specific area of the camera output does not change over a certain period of time or more, it can be determined that dirt adheres to a part of an outer cover corresponding to the pixel in the area. Therefore, when the sensor signal processing unit generates the sensor signal, it is conceivable to perform a dirt determination based on the sensor signal.

However, the present inventor has found that the signal processing unit of the sensor has to continuously output the sensor signal without delay in order to realize rapid sensor signal processing by the vehicle control unit, but the dirt determination does not have to be executed at high speed, and does not have to be executed at all times.

Therefore, an object of the present invention is to provide a vehicle cleaner system suitable for a vehicle capable of automatic driving.

In an automatic driving vehicle capable of executing a manual driving mode and the automatic driving mode, it is required to clean an external sensor that acquires information on the outside of the vehicle when executing the automatic driving mode. On the other hand, there is a limit to an amount of a cleaning medium that can be mounted on the vehicle, and it is also required to suppress the wear of the cleaner.

Therefore, an object of the present invention is to provide a vehicle cleaner system and a vehicle system that can suppress wear of a cleaner unit and consumption of a cleaning medium for keeping an external sensor in a clean state.

Another object of the present invention is to provide a vehicle cleaner system and a vehicle system that can transmit necessary information to a vehicle control unit or a user in accordance with a clean state of an external sensor.

Solution to Problem

According to one aspect of the present invention, there is provided a vehicle cleaner system including:

a cleaner unit mounted on a vehicle and configured to clean an external sensor acquiring information on outside of the vehicle;

an advanced notification information acquiring unit configured to acquire expressway advanced notification information notifying that the vehicle has arrived within a predetermined distance from an entrance of an expressway; and a cleaner control unit configured to, when the advanced notification information acquiring unit has acquired the expressway advanced notification information, control the cleaner unit to clean the external sensor or diagnose whether or not the external sensor needs to be cleaned by the cleaner unit.

According to one aspect of the present invention, there is provided a vehicle cleaner system including:

an external sensor including a sensor element configured to acquire information on outside of a vehicle;

a cleaner capable of cleaning the external sensor;

a cleaner control unit configured to control an operation of the cleaner, and a sensor signal processing unit configured to convert an analog signal output from the sensor element into a digital signal to generate primary digital data.

The sensor signal processing unit is configured to output the primary digital data to both a vehicle control unit configured to control traveling of the vehicle and the cleaner control unit.

A dirt detection unit that detects presence or absence of dirt on the external sensor from the primary digital data is not provided in the sensor signal processing unit, but is provided in the cleaner control unit.

According to one aspect of the present invention, there is provided a vehicle cleaner system mounted on a vehicle. The vehicle cleaner system includes a cleaner unit configured to clean an external sensor with a cleaning medium based on a dirt signal for detecting dirt on the external sensor acquiring information on outside of the vehicle, and a cleaner control unit configured to control the cleaner unit.

The cleaner control unit is configured such that
the external sensor is cleaned by the cleaner unit based on the dirt signal,
whether or not the external sensor is in a clean state after the external sensor is cleaned is determined, and
when an operation amount of the cleaner unit is equal to or greater than a predetermined value even when it is determined that the external sensor is not in the clean state, an operation of the cleaner unit is stopped.

According to one aspect of the present invention, there is provided a vehicle system including:
a vehicle control unit;
a cleaner unit configured to clean an external sensor with a cleaning medium based on a dirt signal for detecting dirt on the external sensor acquiring information on outside of a vehicle; and
a cleaner control unit configured to control the cleaner unit.

The cleaner control unit is configured such that
the external sensor is cleaned b the cleaner unit based on the dirt signal,
whether or not the external sensor is in a clean state after the external sensor is cleaned is determined, and
when an operation amount of the cleaner unit is equal to or greater than a predetermined value even when it is determined that the external sensor is not in the dean state, an operation of the cleaner unit is stopped.

According to one aspect of the present invention, there is provided a vehicle cleaner system mounted on a vehicle including, a vehicle control unit.

The vehicle cleaner system includes a cleaner unit configured to dean an external sensor with a cleaning medium based on a dirt signal detecting dirt on the external sensor acquiring information on outside of the vehicle, and a cleaner control unit configured to control the cleaner unit.

The cleaner control unit is configured such that
the external sensor is cleaned by the cleaner unit based on the dirt signal,
in a case Where cleaning of the external sensor by the cleaner unit satisfies a predetermined condition, whether or not the external sensor is in a clean state is determined, and
when it is determined that the external sensor is not in the clean state, a first non-cleaning signal indicating that the external sensor is not in the clean state is generated, and the first non-cleaning signal is output to the vehicle control unit.

According to one aspect of the present invention, there is provided a vehicle system including:
a vehicle control unit;
a cleaner unit configured to clean an external sensor with a cleaning medium based on a dirt signal for detecting dirt on the external sensor acquiring information on outside of a vehicle; and
a cleaner control unit configured to control the cleaner unit.

The cleaner control unit is configured such that
the external sensor is cleaned by the cleaner unit based on the dirt signal,
in a case where cleaning of the external sensor b the cleaner unit satisfies a predetermined condition, whether or not the external sensor is in a clean state is determined, and
when it is determined that the external sensor is, not in the clean state, a first non-cleaning signal indicating that the external sensor is not in the clean state is generated, and the first non-cleaning signal is output to the vehicle control unit.

Advantageous Effects of Invention

According to one aspect of the present invention, there is provided the vehicle cleaner system that can clean a sensor before entering an expressway.

According to one aspect of the present invention, there is provided the vehicle cleaner system sui table for a vehicle capable of automatic driving.

According to one aspect of the present invention, it is possible to provide the vehicle cleaner system and the vehicle system that can suppress wear of the cleaner unit and consumption of the cleaning medium for keeping an external sensor in the clean state.

According to one aspect of the present invention, it is possible to provide the vehicle cleaner system and the vehicle system that can transmit necessary information to the vehicle control unit or a user in accordance with the clean state of the external sensor.

DESCRIPTION OF EMBODIMENTS

First Embodiment

Figure 1:
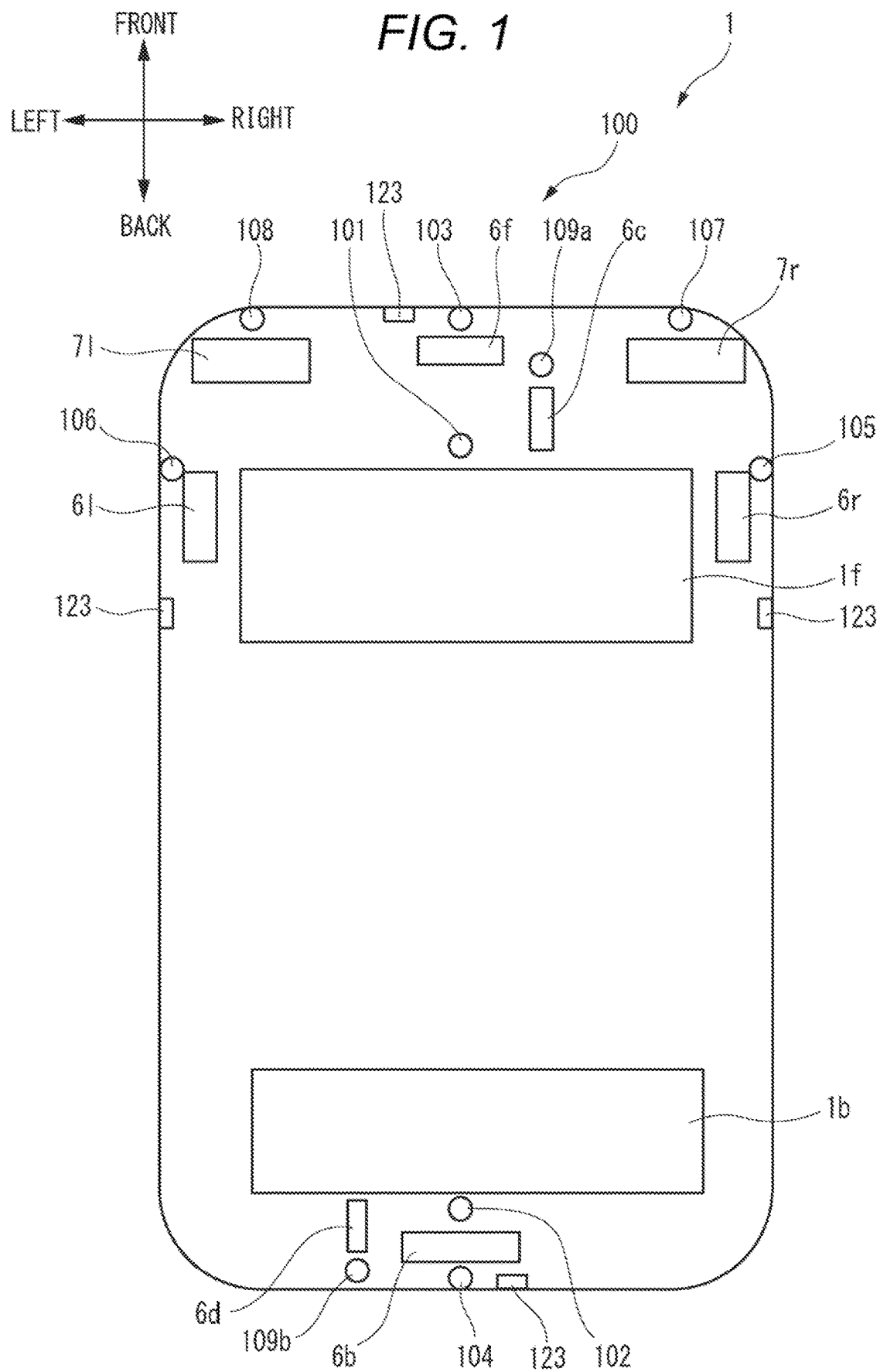
FIG. 1 is a top view of a vehicle equipped with a vehicle cleaner system according to the present invention.

Hereinafter, a first embodiment of the present invention will be described with reference to the drawings. Incidentally, members having the same reference numbers as members that have been described in the description of the present embodiment will be omitted for convenience of description. In addition, dimensions of members shown in the drawings may be different from actual dimensions thereof for convenience of description.

In the description of the present embodiment, "left-right direction", "front-back direction", and "upper-lower direction" are appropriately referred to, for convenience of description. These directions are relative directions set for a vehicle 1 shown in FIG. 1. Here, the "upper-lower direction" is a direction including an "upper direction" and a "lower direction". The "front-back direction" is a direction including a "front direction" and a "back direction". The "left-right direction" is a direction including a "left direction" and a "right direction".

FIG. 1 is a top view of the vehicle 1 in which a vehicle cleaner system 100 (hereinafter, referred to as a cleaner system 100) according to the present embodiment is mounted. The vehicle 1 includes the cleaner system 100. In the present embodiment, the vehicle 1 is an automobile that can travel in an automatic driving mode.

Figure 2:
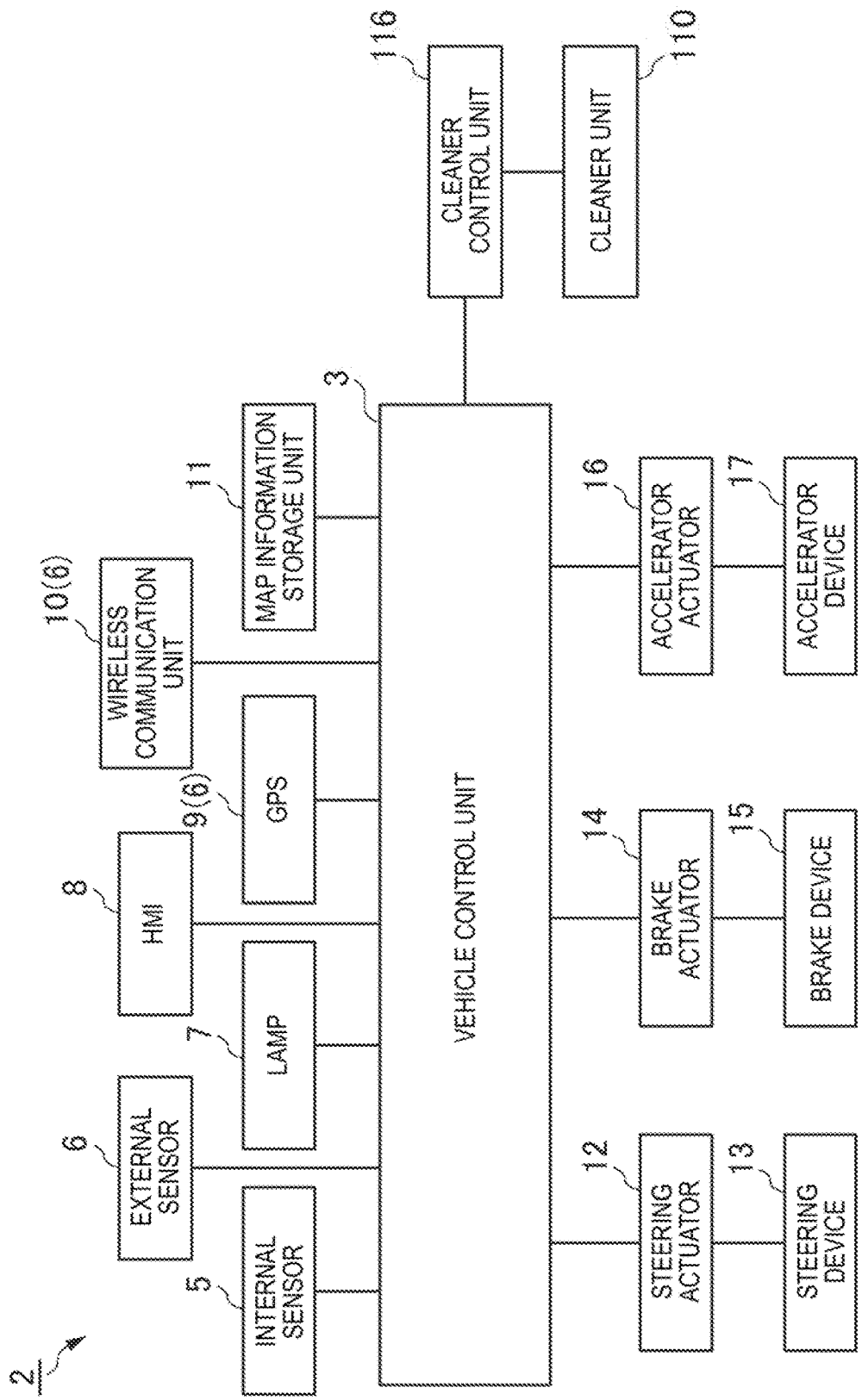
FIG. 2 is a block diagram of a vehicle system.

First, a vehicle system 2 of the vehicle 1 will be described with reference to FIG. 2. FIG. 2 shows a block diagram of the vehicle system 2. As shown in FIG. 2, the vehicle system 2 includes a vehicle control unit 3, an internal sensor 5, an external sensor 6, a lamp 7, a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 includes an electronic control unit (ECU). The vehicle control unit 3 includes a processor such as a central processing unit (CPU), a read only memory (ROM) in which various vehicle control programs are stored, and a random access memory (RAM) in which vehicle control data are temporarily stored. The processor is configured to load a program designated from the various vehicle control programs stored in the ROM onto the RAM and executes various processes in cooperation with the RAM. The vehicle control unit 3 is configured to control traveling of the vehicle 1.

The lamp 7 is at least one of a headlamp or a position lamp provided at a front portion of the vehicle 1, a rear combination lamp provided at a back portion of the vehicle 1, a turn signal lamp provided on the front portion or a side portion of the vehicle, and various lamps for notifying a pedestrian and a driver of other vehicles of a status of a host vehicle.

The HMI 8 includes an input unit that receives an input operation from a user, and an output unit that outputs traveling information or the like to the user. The input unit includes a steering wheel, an accelerator pedal, a brake pedal, a driving mode switching switch that switches a driving mode of the vehicle 1, or the like. The output unit is a display that displays various traveling information.

The internal sensor 5 is a sensor capable of acquiring information of the host vehicle. The internal sensor 5 is, for example, at least one of an acceleration sensor, a vehicle speed sensor, a vehicle wheel speed sensor, a gyro sensor, or the like. The internal sensor 5 is configured to acquire information of the host vehicle including a traveling state of the vehicle 1 and output the information to the vehicle control unit 3.

The internal sensor 5 may include a sensor that detects a displacement of the HMI 8, a seating sensor that detects whether the user is sitting on a seat, a face orientation sensor that detects a direction of a face of the user, a human detection sensor that detects whether or not there is a person in the vehicle, or the like.

The external sensor 6 is a sensor capable of acquiring information on outside of the host vehicle. The external sensor is, for example, at least one of a camera, a radar, a LiDAR, the GPS 9, the wireless communication unit 10, or the like. The external sensor 6 is configured to acquire information on the outside of the host vehicle including a surrounding environment of the vehicle 1 (other vehicle, the pedestrian, a road shape, a traffic sign, an obstacle, or the like) and output the information to the vehicle control unit 3. Alternatively, the external sensor 6 may include a weather sensor that detects a weather condition, an illuminance sensor that detects an illuminance of the surrounding environment of the vehicle 1, or the like.

The camera is, for example, a camera including an image pickup element such as a charge-coupled device (CCD) or a complementary MOS (CMOS). The camera is a camera that detects visible light or an infrared camera that detects infrared rays.

The radar is a millimeter-wave radar, a microwave radar, a laser radar, or the like.

The LiDAR is an abbreviation for light detection and ranging or laser imaging detection and ranging. The LiDAR is a sensor that generally emits non-visible light forward and acquires information such as a distance to an object, a shape of the object, a material of the object, a color of the object, or the like based on the emitted light and return light.

The GPS 9, which is a kind of the external sensor 6, is configured to acquire the current position information of the vehicle 1 by measuring a distance of a plurality of artificial satellites with respect to the host vehicle 1, and output the acquired current position information to the vehicle control unit 3. The wireless communication unit 10, which is a kind of the external sensor 6, is configured to receive traveling information of another vehicle around the vehicle 1 from the other vehicle and transmit the traveling information of the vehicle 1 to the other vehicle (inter-vehicle communication).

In addition, the wireless communication unit 10 is configured to receive infrastructure information from infrastructure equipment such as a traffic light or a sign lamp and transmit the traveling information of the vehicle 1 to the infrastructure equipment (road-to-vehicle communication). The map information storage unit 11 is an external storage device such as a hard disk drive in which map information is stored, and is configured to output the map information to the vehicle control unit 3.

The vehicle control unit 3 is configured to input an output of the internal sensor 5 that detects a displacement of an operator operated y a user such as the steering wheel, the accelerator pedal, and the brake pedal, an output of the internal sensor 5 that detects a state of the vehicle, such as the vehicle speed sensor, the vehicle wheel speed sensor, the acceleration sensor, and the yaw rate sensor, and an output of the external sensor 6 that acquires the information on the outside of the vehicle 1. The vehicle control unit 3 is configured to generate a steering control signal, an accelerator control signal, and a brake control signal based on these outputs, and control (process) these signals as necessary.

The steering actuator 12 is configured to receive the steering control signal from vehicle control unit 3 and control the steering device 13 based on the received steering coni hi signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal.

The vehicle 1 can travel in the automatic driving mode and a manual driving mode. The vehicle control unit 3 can selectively execute the automatic, driving mode and the manual driving mode.

In the automatic driving mode, the vehicle control unit 3 automatically generates the steering control signal, the accelerator control signal, and the brake control signal in accordance with the output of the external sensor 6 that acquires the information on the outside of the vehicle 1. The vehicle control unit automatically generates the steering control signal, the accelerator control signal, and the brake control signal in accordance with the output of the external sensor 6, regardless of the output of the internal sensor 5 that detects the displacement of the operator that can be operated by the user.

For example, in the automatic driving mode, the vehicle control unit 3 automatically generates the steering control signal, the accelerator control signal, and the brake control signal based on surrounding environment information in front of the vehicle 1 acquired by a front camera 6c, the current position information of the GPS 9, the map information stored in the map information storage unit 11, or the like. In the automatic driving mode, the vehicle 1 is driven independently of the user.

In the manual driving mode, the vehicle control unit 3 normally generates the steering control signal, the accelerator control signal, and the brake control signal regardless of the output of the external sensor 6. That is, in the manual driving mode, the vehicle control unit 3 generates the steering control signal based on the operation of the steering wheel of the user, regardless of the output of the external sensor 6. The vehicle control unit 3 normally generates the accelerator control signal based on the operation of the accelerator pedal of the user, regardless of the output of the external sensor 6. The vehicle control unit 3 generates the brake control signal based on the operation of the brake pedal of the user, regardless of the output of the external sensor 6. In the manual driving mode, the vehicle 1 is normally driven by the user.

In the manual driving mode, the vehicle control unit 3 may execute an anti-lock brake control for controlling the brake control signal in accordance with the output of the vehicle wheel speed sensor, which is the internal sensor 5, for example. In the manual driving mode, the vehicle control unit 3 may execute a skid prevention control (electric stability control), a traction control, or the like, which controls at least one of the steering control signal, the accelerator control signal, and the brake control signal in accordance with the output of a steering angle sensor, the vehicle wheel speed sensor, and the yaw rate sensor that are the internal sensors 5.

Alternatively, in the manual driving mode, the vehicle control unit 3 may execute a pre-crash control and a collision avoidance control for generating the steering control signal and the brake control signal in accordance with the output of the external sensor 6 such as the front camera 6c in an emergency. In this manner, in the manual driving mode, the vehicle control unit 3 may generate at least one of the steering control signal, the accelerator control signal, and the brake control signal in accordance with the output of the external sensor 6 in an emergency.

In the manual driving mode, a trigger for generating the steering control signal, the accelerator control signal, and the brake control signal is normally a displacement of an operator such as the steering wheel, the accelerator pedal, and the brake pedal operated by the user. In the manual driving mode, the vehicle control unit 3 may normally control (process) a signal such as the steering control signal, the accelerator control signal, and the brake control signal generated by the displacement of the operator in accordance with the output of the internal sensor 5 or the external sensor 6. In the present embodiment, the so-called assist driving mode that assists the driving of the user in accordance with the output of the internal sensor 5 or the external sensor 6 is one form of the manual driving mode.

According to the definitions of levels 0 to 5 of the automatic driving mode currently known as of 2018, the automatic driving mode of the present embodiment corresponds to levels 3 to 5 (except for an emergency or the like), and the manual driving mode of the present embodiment corresponds to levels 0 to 2.

Referring back to FIG. 1, the vehicle 1 includes, as the external sensor 6, a front LiDAR 6f, a back LiDAR 6b, a right LiDAR 6r, a left LiDAR 6l, the front camera 6c, and a back camera 6d. The front LiDAR Of is configured to acquire information on a front side of the vehicle 1. The back LiDAR 6b is configured to acquire information on a back side of the vehicle 1. The right LiDAR 6r is configured to acquire information on a right side of the vehicle 1. The left LiDAR 6l is configured to acquire information on a left side of the vehicle 1. The front camera 6c is configured to acquire information on the front side of the vehicle 1. The back camera 6d is configured to acquire information on the back side of the vehicle 1.

In the example shown in FIG. 1, the front LiDAR 6f is provided on a front portion of the vehicle 1, the back LiDAR 6b is provided on a back portion of the vehicle 1, the right LiDAR 6r is provided on a right portion of the vehicle 1, and the left LiDAR 6l is provided on a left portion of the vehicle 1, but the present invention is not limited to this example. For example, the front LiDAR, the back LiDAR, the right LiDAR, and the left LiDAR may be collectively arranged on a ceiling portion of the vehicle 1.

The vehicle 1 includes a right headlamp 7r and a left headlamp 7l as the lamp 7. The right headlamp 7r is provided on a right portion on the front portion of the vehicle 1, and the left headlamp 7l is provided on the left portion on the front portion of the vehicle 1. The right headlamp 7r is provided on a right side of the left headlamp 7l.

The vehicle 1 includes a front window 1f and a rear window 1b.

The vehicle 1 includes the cleaner system 100 according to the embodiment of the present invention. The cleaner system 100 is a system that removes foreign matters such as a water droplet, mud, dust, or the like adhering to an object to be cleaned using a cleaning medium. In the present embodiment, the cleaner system 100 is a front window washer (hereinafter, referred to as a front WW) 101, a back window washer (hereinafter, referred to as a back WW) 102, a front LiDAR cleaner (hereinafter referred to as a front LC) 103, and a back LiDAR cleaner (hereinafter, referred to as a back LC) 104, a right LiDAR cleaner (hereinafter referred to as a right LC) 105, and a left LiDAR cleaner (hereinafter, referred to as a left LC) 106, a right headlamp cleaner (hereinafter referred to as a right HC) 107, and a left headlamp cleaner (hereinafter referred to as a left HC) 108, a front camera cleaner 109a, and a back camera cleaner 109b. Each of the cleaners 101 to 109b includes one or more nozzles, and discharges the cleaning medium such as a cleaning liquid or air from the nozzle toward the object to be cleaned, Incidentally, each of the cleaners 101 to 109b may be referred to as a cleaner unit 110.

The front WW 101 can clean the front window 1f. The back WW 102 can clean the rear window 1b. The front LC 103 can clean the front LiDAR 6f. The back LC 104 can clean the back LiDAR 6b. The right LC 105 can clean the right LiDAR 6r. The left LC 106 can clean the left LiDAR 6l. The right HC 107 can clean the right headlamp 7r. The left HC 108 can clean the left headlamp 7l. The front camera cleaner 109a can clean the front camera 6c. The back camera cleaner 109b can clean the back camera 6d.

Figure 3:
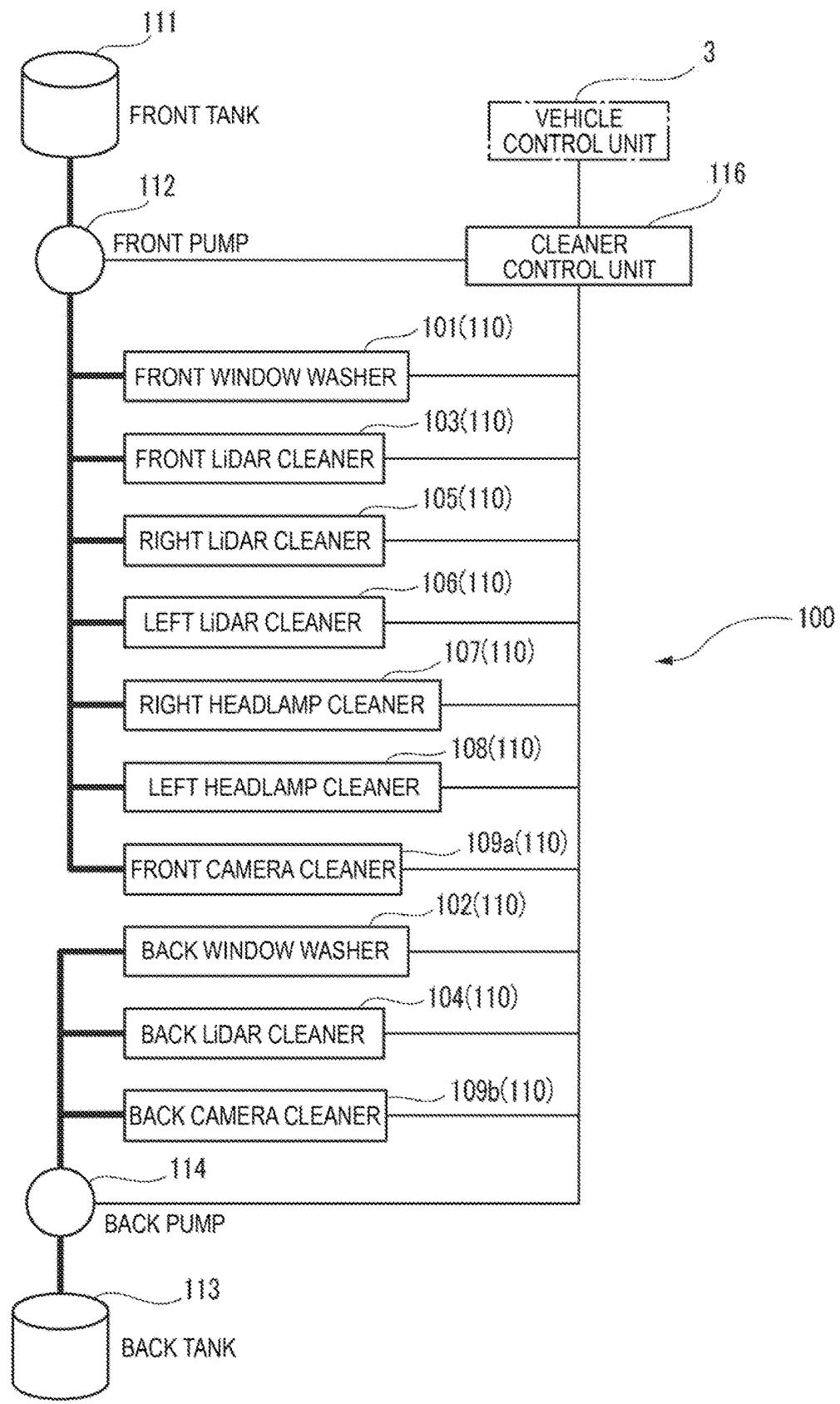
FIG. 3 is a schematic view of the vehicle cleaner system.

FIG. 3 is a schematic view of the cleaner system 100. The cleaner system 100 includes, in addition to the cleaner units 101 to 109b, a front tank 111, a front pump 112, a back tank 113, a back pump 114, and a cleaner control unit 116 (control unit).

The front WW 101, the front LC 103, the right LC 105, the left LC 106, the right HC 107, the left HC 108, and the front camera cleaner 109a are connected to the front tank 111 via the front pump 112. The front pump 112 sends the cleaning liquid stored in the front tank 111 to the front WW 101, the front LC 103, the right LC 105, the left LC 106, the right HC 107, the left HC 108, and the front camera cleaner 109a.

The back WW 102, the back LC 104, and the back camera cleaner 109b are connected to the back tank 113 via the back pump 114. The back pump 114 sends the cleaning liquid stored in the back tank 113 to the back WW 102, the back LC 104, and the back camera cleaner 109b.

Each of the cleaners 101 to 109b is provided with an actuator that opens the nozzle to discharge the cleaning liquid to the object to be cleaned. The actuator provided in each of the cleaners 101 to 109b is electrically connected to the cleaner control unit 116. In addition, the cleaner control unit 116 is also electrically connected to the front pump 112, the back pump 114, and the vehicle control unit 3.

Figure 4:
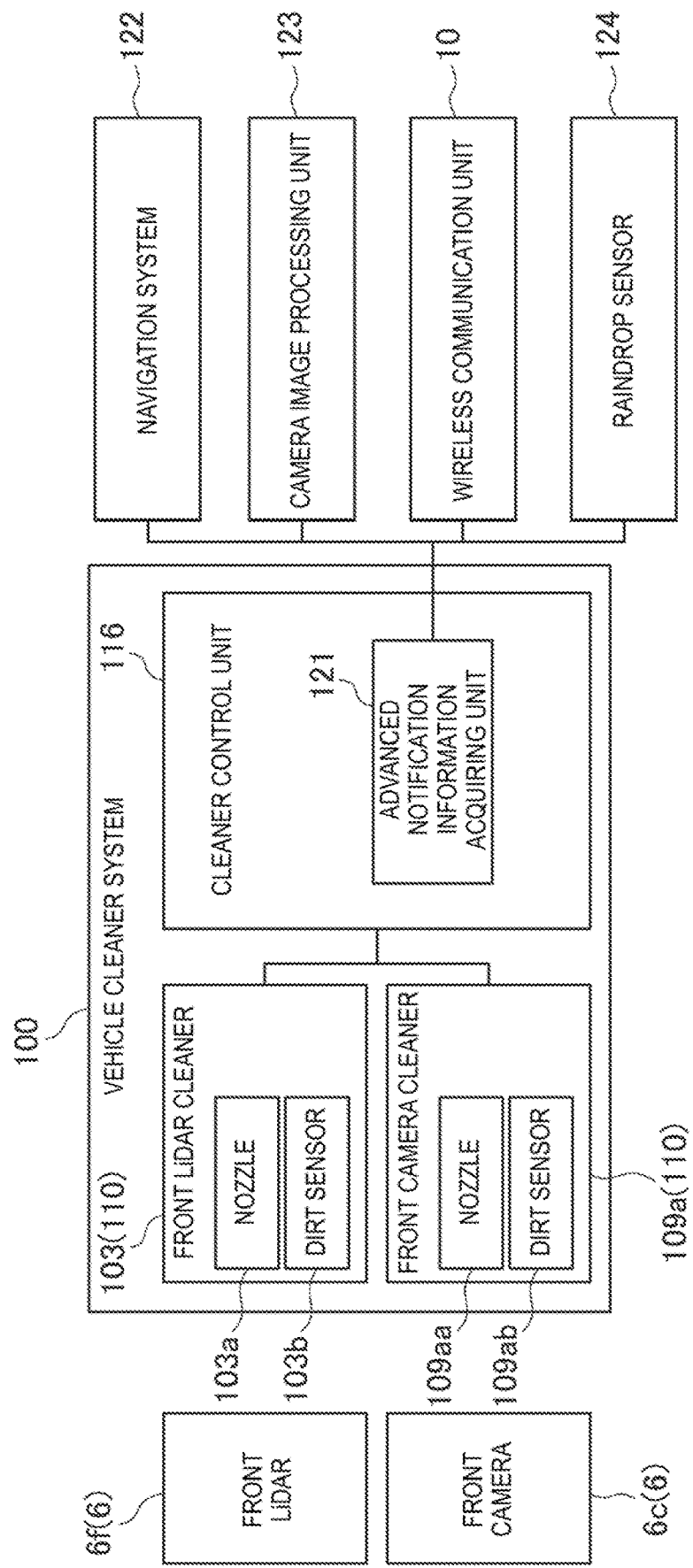
FIG. 4 is a block diagram of a main part of a vehicle cleaner system according to a first embodiment of the present invention.

FIG. 4 is a block diagram of a main part of the cleaner system 100 according to a first embodiment of the present invention.

As shown in FIG. 4, the cleaner system 100 includes the plurality of cleaner units 110 such as the front LC 103 and the front camera cleaner 109a, the cleaner control unit 116, and an advanced notification information acquiring unit 121. Although only the front LC 103 and the front camera cleaner 109a are shown as the cleaner units 110 in FIG. 4, it is needless to say that the cleaner system 100 includes the other cleaner units 110 as shown in FIG. 1.

The front LC 103 includes a nozzle 103a that discharges the cleaning medium to the front LiDAR 6f, and a dirt sensor 103b that detects whether or not the front LiDAR 6f is dirty. The front camera cleaner 109a includes a nozzle 109aa that discharges the cleaning medium to the front camera 6c, and a dirt sensor 109ab that detects whether or not the front camera 6c is dirty. The cleaner control unit 116 is connected to the front LC 103 and the front camera cleaner 109a, respectively.

The cleaner control unit 116 is configured to control each cleaner unit 110. The cleaner control unit 116 is configured by, for example, at least one electronic control unit (ECU). The electronic control unit may include at least one microcontroller including one or more processors and one or more memories, and another electronic circuit including an active element such as a transistor and a passive element. The processor is, for example, a central processing unit (CPU), a micro processing unit (MPU) and/or a graphics processing unit (GPU). The CPU may be configured by a plurality of CPU cores. The GPU may be configured by a plurality of GPU cores. The memory includes a read only memory (ROM) and a random access memory (RAM). A control program for the cleaner unit 110 may be stored in the ROM.

The processor may be configured to load a program designated from a program group stored in the ROM onto the RAM and execute various processes in cooperation with the RAM. In addition, the electronic control unit (ECU) may be configured by an integrated circuit (hardware resource) such as an application specific integrated circuit (ASIC) or a field programmable gate array (FPGA). Further, the electronic control unit may be configured by a combination of at least one microcontroller and an integrated circuit.

The advanced notification information acquiring unit 121 acquires expressway advanced notification information notifying that the host vehicle has arrived within a predetermined distance from an entrance of an expressway S. The advanced notification information acquiring unit 121 is connected to at least one of the wireless communication unit 10, a navigation system 122, a camera image processing unit 123, a raindrop sensor 124, or the like, and acquires the expressway advanced notification information. In first to third flowcharts described below with reference to FIGS. 6 to 8, the advanced notification information acquiring unit 121 is configured to acquire the expressway advanced notification information from the wireless communication unit 10.

Figure 5:
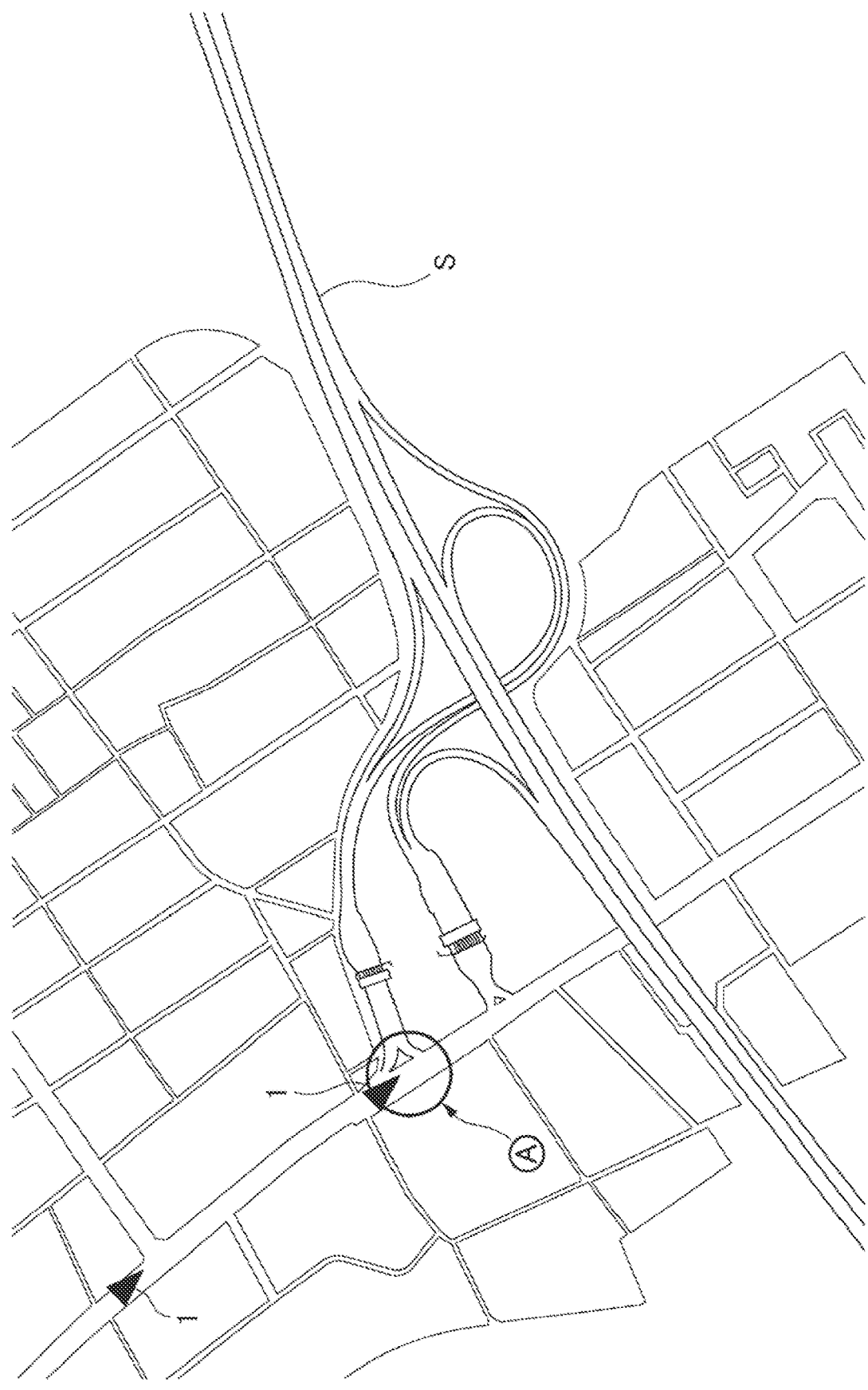
FIG. 5 is a schematic view showing a position of a host vehicle.

FIG. 5 is a schematic view showing a position of the host vehicle. In an example shown in FIG. 5, a transmission device that emits a wireless signal notifying that this point is the entrance of the expressway S is installed at the entrance of the expressway S. In FIG. 5, an area in which strength of the wireless signal emitted from the transmission device is equal to or larger than a predetermined value is indicated by a symbol A. When the host vehicle enters an area A, the wireless communication unit 10 acquires the wireless signal emitted from the transmission device and transmits the expressway advanced notification information to the advanced notification information acquiring unit 121. In addition, in a case where the host vehicle is located outside the area A, the advanced notification information acquiring unit 121 does not receive the expressway advanced notification information.

Figure 6:
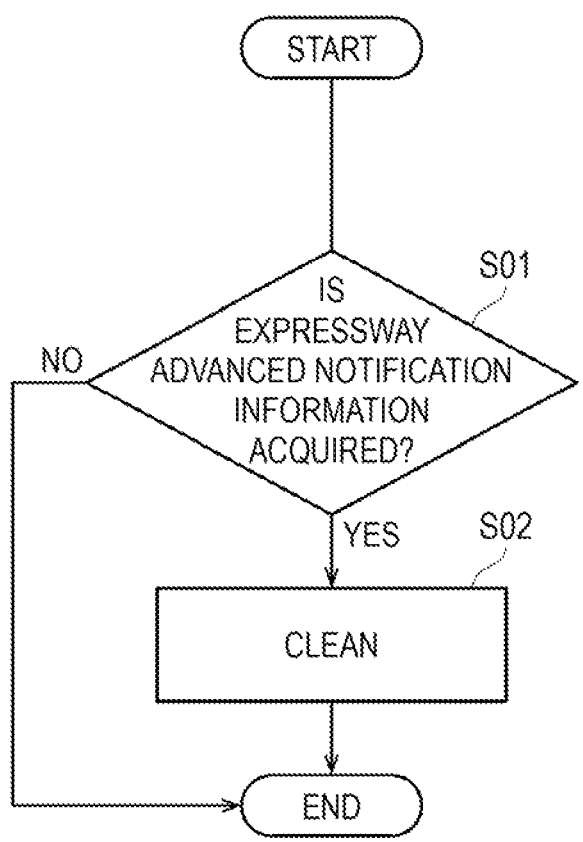
FIG. 6 is a first flowchart executed by a cleaner control unit of the vehicle cleaner system according to the first embodiment.

FIG. 6 is a first flowchart executed by the cleaner control unit 116 of the vehicle cleaner system 100 according to the first embodiment. As shown in FIG. 6 first, the cleaner control unit 116 determines whether or not the advanced notification information acquiring unit 121 has acquired the expressway advanced notification information (step S01).

In a case where the host vehicle is located outside the area A and the advanced notification information acquiring unit 121 does not acquire the expressway advanced notification information (step S01: No), the cleaner control unit 116 ends the process.

In a case where the host vehicle is located in the area A and the advanced notification information acquiring unit 121 has acquired the expressway advanced notification information (step S01: Yes), the cleaner control unit 116 drives the cleaner unit 110 to clean the external sensor, and ends the process (step S02).

In step S02, the cleaner control unit 116 may drive at least one of the cleaner units 110, or may operate all the cleaner units 110. However, since sensitivity of the external sensor 6 that acquires external information in front is required when traveling on the expressway S, it is preferable to operate at least the front camera cleaner 109*a* for cleaning the front camera 6*c* that acquires information on the front side of the vehicle and the front LC 103 for cleaning the front LiDAR 6*f*.

As described above, according to the vehicle cleaner system 100 according to the present embodiment, since the external sensor 6 can be in a clean state before the host vehicle enters the expressway S, the sensitivity of the external sensor 6 when traveling on the expressway S can be increased.

In the first flowchart shown in FIG. 6, the external sensor 6 is always cleaned when the expressway advanced notification information is acquired, but the present invention is not limited thereto. The cleaner control unit 116 may be configured to execute a second flowchart shown in FIG. 7 instead of the first flowchart shown in FIG. 6.

Figure 7:
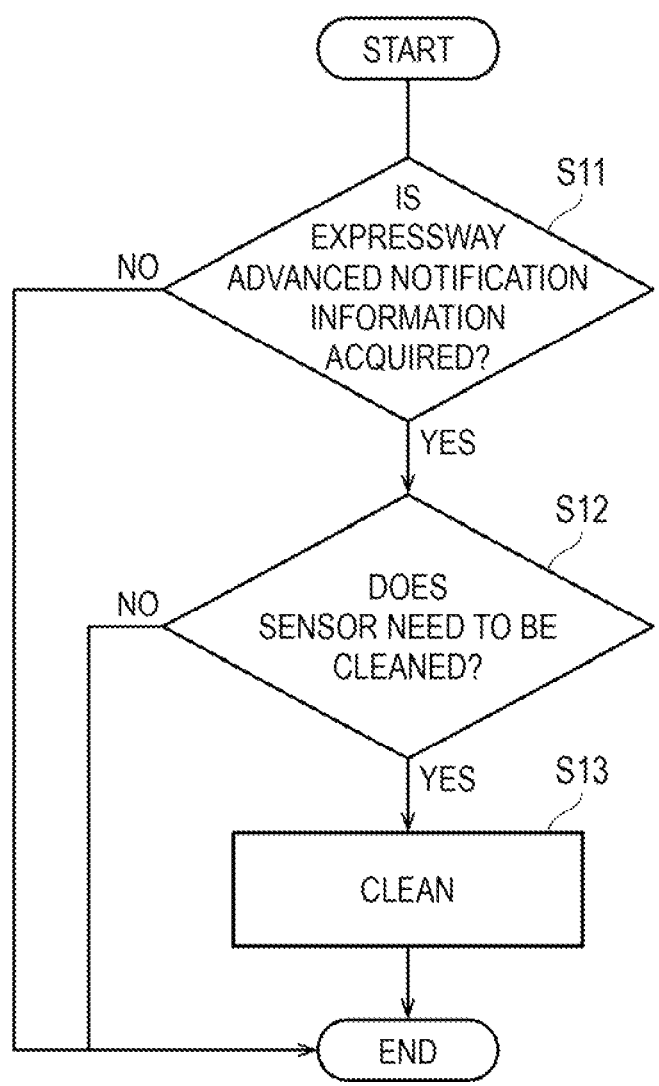
FIG. 7 is a second flowchart executed by the cleaner control unit of the vehicle cleaner system according to the first embodiment.

As shown in FIG. 7, the cleaner control unit 116 determines whether or not the advanced notification information acquiring unit 121 has acquired the expressway advanced notification information (step S11).

In the case where the host vehicle is located outside the area A and the advanced notification information acquiring unit 121 does not acquire the expressway advanced notification information (step S11: No), the cleaner control unit 116 ends the process.

In the case where the host vehicle is located in the area A and the advanced notification information acquiring unit 121 has acquired the expressway advanced notification information (step S11: Yes), the cleaner control unit 116 diagnoses whether or not the external sensor needs to be cleaned (step S12).

For example, the cleaner control unit 116 determines whether or not the front LiDAR 6*f* is clean in accordance with the output of the dirt sensor 103*b* that detects the dirt of the front LiDAR 6*f*. Alternatively, the front LC 103 may be configured to transmit a signal notifying whether or not the front LiDAR 6*f* needs to be cleaned to the cleaner control unit 116 in accordance with the output of the dirt sensor 103*b*, and the cleaner control unit 116 may be configured to determine whether or not the front LiDAR 6*f* is clean in accordance with the signal of the front LC 103. The cleaner control unit 116 determines whether or not the external sensor 6 to be cleaned is clean for the other cleaner unit 110, similarly to the front LC 103.

When the cleaner control unit 116 determines that the external sensor 6 does not need to be cleaned (step S12: No), the cleaner control unit 116 ends the process without cleaning the external sensor 6 that is determined to be unnecessary to be cleaned.

When the cleaner control unit 116 determines that the external sensor 6 needs to be cleaned (step S12: Yes), the cleaner control unit 116 cleans the external sensor 6 that is determined to be necessary to be cleaned (step S13), and ends the process.

The cleaner control unit 116 executes a second flow shown in FIG. 7 for each cleaner unit 110.

Accordingly, since the clean external sensor 6 is not cleaned, the sensitivity of the external sensor 6 can be kept high before traveling on the expressway S while saving the cleaning medium.

In the second flowchart shown in FIG. 7, the necessity of the cleaning of the external sensor 6 is determined in accordance with the dirt of the external sensor 6, but the present invention is not limited thereto. The cleaner control unit 116 may be configured to execute a third flowchart shown in FIG. 8 instead of the second flowchart shown in FIG. 7.

Figure 8:
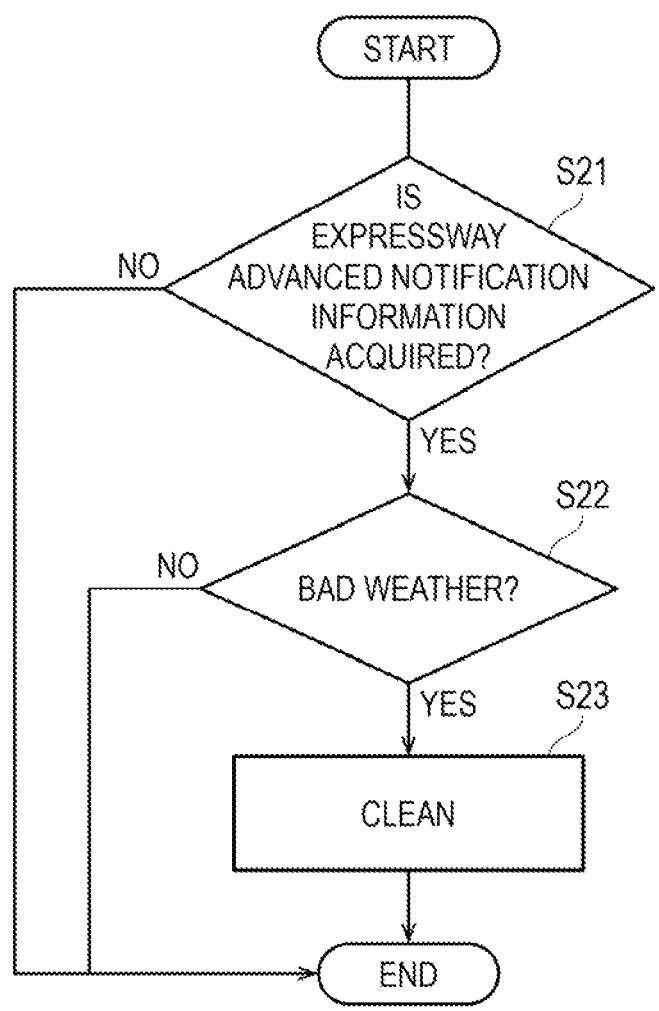
FIG. 8 is a third flowchart executed by the cleaner control unit of the vehicle cleaner system according to the first embodiment.

As shown in FIG. 8, the cleaner control unit 116 determines whether or not the advanced notification information acquiring unit 121 has acquired the expressway advanced notification information (step S21).

In the case where the host vehicle is located outside the area A and the advanced notification information acquiring unit 121 does not acquire the expressway advanced notification information (step S21: No), the cleaner control unit 116 ends the process.

In the case where the host vehicle is located in the area A and the advanced notification information acquiring unit 121 has acquired the expressway advanced notification information (step S21: Yes), the cleaner control unit 116 acquires weather information and determines whether or not it is weather for operating the cleaner unit 110 (step S22).

The weather information is, for example, weather information provided from the outside acquired by the wireless communication unit 10, information output from the raindrop sensor 124 indicating that rain is falling, or the like. In a case where it is raining, there is a high possibility that dirt adheres to the external sensor 6 due to muddy water or the like splashed by a vehicle traveling ahead of the host vehicle. Alternatively, in a case where the strong wind is blown, the dust is likely to adhere to the external sensor 6. As described above, the weather in which the dirt is likely to adhere to the external sensor 6 is recorded in the memory as a predetermined weather condition. The cleaner control unit 116 reads the predetermined weather condition from the memory and collates it with the weather information to determine whether or not the acquired weather information matches the predetermined weather condition. In this manner, the cleaner control 116 determines whether or not it is the weather for operating the cleaner unit 110.

When the cleaner control unit 116 determines that it is the weather for operating the cleaner unit 110 (step S22: Yes), the cleaner unit 110 is operated to clean the external sensor 6, and the process ends.

When the cleaner control unit 116 determines that it is not the weather for operating the cleaner unit 110 (step S22: No), the process ends without operating the cleaner unit 110.

In a case where the weather in which the dirt is likely to adhere to the external sensor 6 is set as common weather for all the cleaner units 110, when the cleaner control unit 116 determines that it is the weather for operating the cleaner unit 110 (step S22: Yes), all the cleaner units 110 are operated to clean the external sensors 6, the process ends.

Alternatively, in a case where the weather in which the dirt is likely to adhere to the external sensor 6 is set as individual weather for each cleaner unit 110, time cleaner control unit 116 determines step S22 for each cleaner unit 110, and performs cleaning/non-cleaning of each cleaner unit 110 based on a determination result.

With such a configuration, the external sensor 6 is cleaned when the external sensor 6 is likely to be dirty before the host vehicle entering the expressway S. Therefore, the sensitivity of the external sensor 6 when the vehicle travels on the expressway S can be increased.

Second Embodiment

Figure 9:
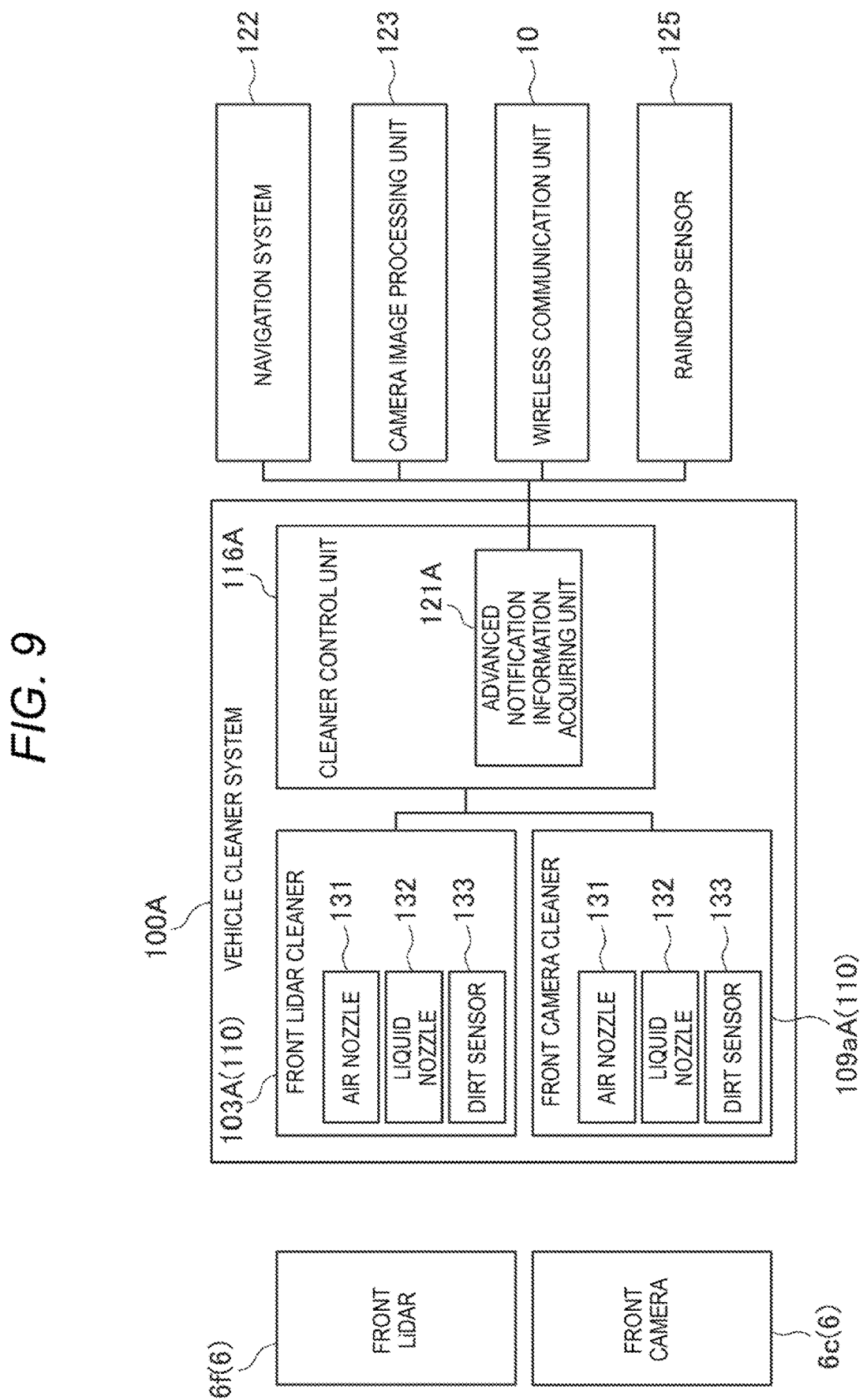
FIG. 9 is a block diagram of a main part of a vehicle cleaner system according to a second embodiment of the present invention.

FIG. 9 is a block diagram of a main part of a vehicle cleaner system 100A according to a second embodiment of the present invention. As shown in FIG. 9, each of the plurality of cleaner units 110 includes an air nozzle 131 that discharges air as the cleaning medium to the external sensor 6, a liquid nozzle 132 that discharges the cleaning liquid as the cleaning medium to the external sensor 6, and a dirt sensor 133 that detects dirt on the external sensor 6. Specifically, a front LC 103A includes the air nozzle 131 that discharges air as the cleaning medium to the front LiDAR of, the liquid nozzle 132 that discharges the cleaning liquid as the cleaning medium to the front LiDAR 6f, and the dirt sensor 133 that detects dirt on the front LiDAR. 6f. Similarly, a front camera cleaner 109aA and the other cleaner units 110 also include the air nozzle 131, the liquid nozzle 132, and the dirt sensor 133.

Figure 10:
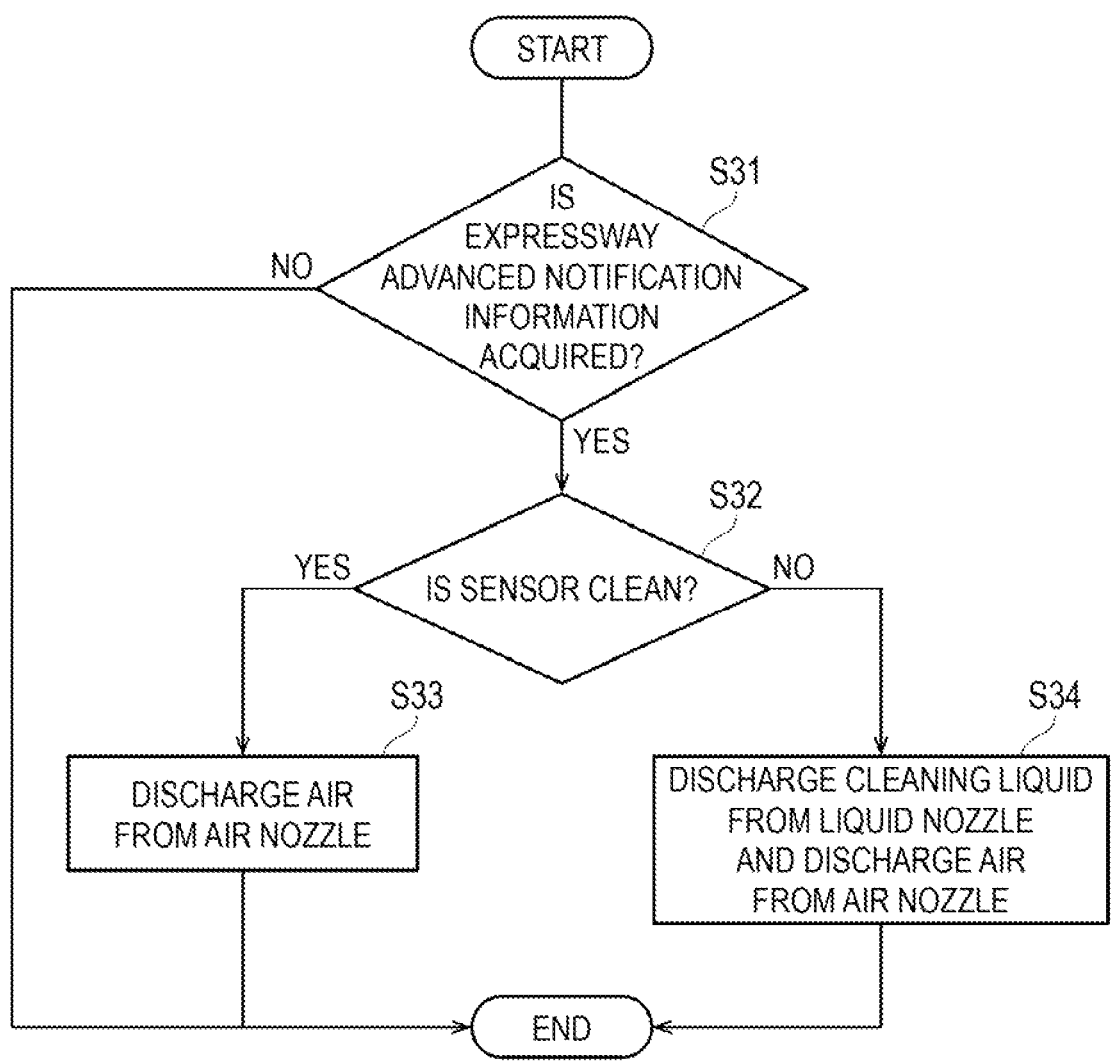
FIG. 10 is a fourth flowchart executed by a cleaner control unit of the vehicle cleaner system according to the second embodiment.

FIG. 10 is a fourth flowchart executed by a cleaner control unit 116A of the vehicle cleaner system 100A according to the second embodiment. As shown in FIG. 10, the cleaner control unit 116A determines whether or not an advanced notification information acquiring unit 121A has acquired the expressway advanced notification information (step S31).

In a case where the host vehicle 1 is located outside the area A and the advanced notification information acquiring unit 121A does not acquire the expressway advanced notification information (step S31: No), the cleaner control unit 116A ends the process.

In a case where the host vehicle 1 is located in the area A and the advanced notification information acquiring unit 121A has acquired the expressway advanced notification information (step S31: Yes), the cleaner control unit 116A determines whether the external sensor 6 is clean (step S32).

In a case where the cleaner control unit 116A determines that the external sensor 6 is clean (step S32: Yes), the cleaner control unit 116A controls the cleaner unit 110 such that the cleaning liquid is not discharged from the liquid nozzle 132 toward the external sensor 6 that is determined to be clean, and air is discharged from the air nozzle 131 toward the external sensor 6 that is determined to be clean (step S33).

In a case where the cleaner control unit 116A determines that the external sensor 6 is not clean (step S32: No), the cleaner control unit 116A controls the cleaner unit 110 such that the cleaning liquid is discharged from the liquid nozzle 132 toward the external sensor 6 that is determined to be not clean, and air is discharged from the air nozzle 131 toward the external sensor 6 that is determined to be not clean (step S34).

The cleaner control unit 116A may execute the third flowchart for all the cleaner units 110, or may execute the third flowchart for specific one or more cleaner units 110.

In the case where the cleaner unit 110 includes the air nozzle 131 and the liquid nozzle 132 as in the present embodiment, since it is not necessary to save the air as the cleaning medium, and the air may be positively discharged from the air nozzle 131 to the external sensor 6. As described above, even when it is determined that the external sensor 6 is not dirty, the external sensor 6 is easily maintained in a clean state by positively discharging the air from the air nozzle 131 to the external sensor 6.

With such a configuration as well, the sensitivity of the external sensor 6 before the host vehicle enters the expressway S and when the host vehicle travels on the expressway S can be increased.

In the first embodiment and the second embodiment described above, the configuration in which when the wireless communication unit 10 acquires the wireless signal notifying that the point is the entrance of the expressway S transmitted from the transmission device installed at the entrance of the expressway S, the wireless communication unit 10 inputs the advanced notification information to the advanced notification information acquiring unit 121A has been described, but the present invention is not limited to this.

Figure 11:
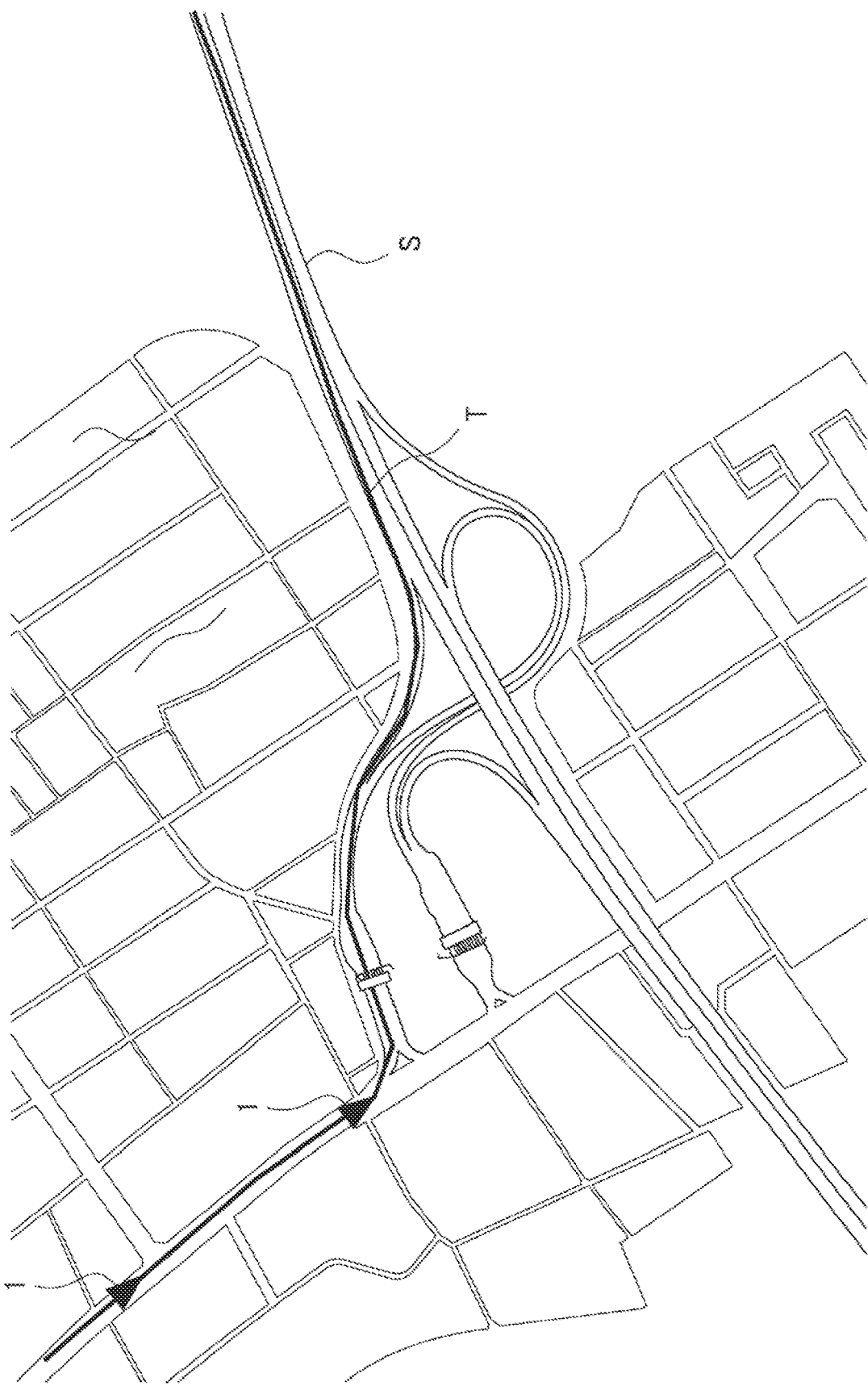
FIG. 11 is a schematic view showing a position of a host vehicle.

FIG. 11 is a schematic view showing the position of the host vehicle 1. In FIG. 11, a planned route T of the host vehicle 1 set by the navigation system 122 and the entrance of the expressway S are displayed. As shown in FIG. 11, in a case where there is the expressway S on the planned route T, the navigation system 122 may be configured to transmit the expressway advanced notification information to the advanced notification information acquiring unit 121A when the host vehicle 1 arrives a point in front of a predetermined length (for example, 1 km before) from the entrance. Even with such a configuration, the advanced notification information acquiring unit 121A can acquire the expressway advanced notification information.

The camera image processing unit 123 may be configured to transmit the expressway advanced notification information to the advanced notification information acquiring unit 121A when the front camera 6c captures an image of a sign or the like indicating the entrance of the expressway S, and the camera image processing unit 123 of the vehicle control unit 3 recognizes the sign. Alternatively, the front camera 6c may be configured to transmit the expressway advanced notification information to the advanced notification information acquiring unit 121A when the image processing unit of the front camera 6c recognizes the sign or the like.

In the embodiment shown in FIG. 4, an example in which the advanced notification information acquiring unit 121A is incorporated in the electronic control unit forming the cleaner control unit 116 is shown, but the advanced notification information acquiring unit 121A may be incorporated in the electronic control unit forming the vehicle control unit 3, or may be configured separately from the cleaner control unit 116 and the vehicle control unit 3. In addition, a single electronic control unit may function as both the cleaner control unit 116 and the vehicle control unit 3.

In the embodiment shown in FIG. 4, a configuration in which the vehicle cleaner system 100 includes the cleaner unit 110, the cleaner control unit 116, and the advanced notification information acquiring unit 121A, but the present invention is not limited thereto. The vehicle cleaner system 100 may include the external sensor 6 in addition to the cleaner unit 110, the cleaner control unit 116, and the advanced notification information acquiring unit 121A. Alternatively, the vehicle cleaner system 100 may include the vehicle control unit 3 in addition to the cleaner unit 110, the cleaner control unit 116, and the advanced notification information acquiring unit 121A.

Third Embodiment

Figure 12:
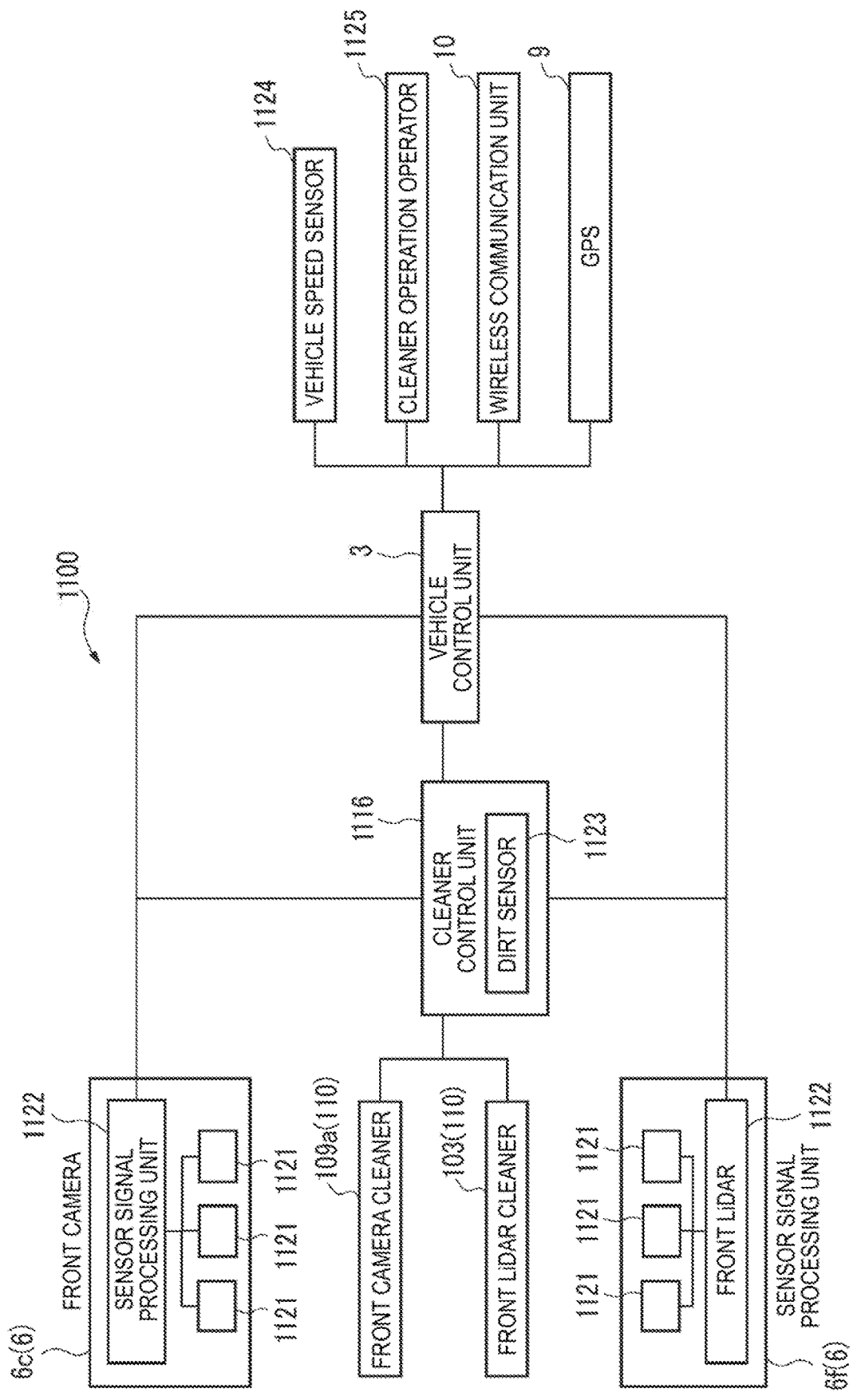
FIG. 12 is a block diagram of a main part of a vehicle cleaner system according to a third embodiment of the present invention.

FIG. 12 is a block diagram of a main part of a vehicle cleaner system 1100 according to a third embodiment of the present invention. As shown in FIG. 12, a vehicle cleaner system 1100 includes the cleaner units 110 that clean the external sensors 6, a cleaner control unit 1116 that controls the operations of the cleaner units 110, and the external sensors 6. Although only the front camera cleaner 109a and the front LC 103 are shown as the cleaner units 110 in FIG. 12, it is needless to say that the vehicle cleaner system 1100 includes the other cleaner units 110 as in the vehicle cleaner system 100 shown in FIG. 3. Similarly, although only the front camera 6c and the front LiDAR 6f are shown as the external sensors 6 in FIG. 12, it is needless to say that the vehicle cleaner system 1100 includes the other external sensors 6 as in the vehicle cleaner system 100 shown in FIG. 1.

The cleaner control unit 1116 is configured to control each cleaner unit 110. A configuration of the cleaner control unit 1116 is the same as that of the cleaner control unit 116 of the vehicle cleaner system 100, and therefore a detailed description thereof will be omitted.

As shown in FIG. 12, each of the front camera 6c and the front LiDAR 6f includes a plurality of sensor elements 1121 and a sensor signal processing unit 1122.

Each of the sensor elements 1121 included in the front camera 6c is, for example, an image sensor such as a CCD or a CMOS sensor. The image sensor outputs an analog signal indicating the intensity of the received light. The front LIDAR 6f includes, for example, a pin photodiode, an avalanche photodiode, or a photomultiplier tube as the sensor element 1121. The sensor element 1121 mounted on the front LiDAR 6f also outputs an analog signal.

The sensor signal processing unit 1122 is an electronic processing device that collectively converts analog data output from the plurality of sensor elements 1121 mounted on the corresponding external sensor 6 into digital data. The sensor signal processing unit 1122 is configured to output the digital data thus obtained.

The sensor signal processing unit 1122 is, for example, an A/D converter. The sensor signal processing unit 1122 may include an amplifier for processing the output of the analog data, a high-pass filter, a low-pass filter, or the like, in addition to the A/D converter.

In addition, the sensor signal processing unit 1122 may perform a process of converting the digital data into more easy-to-handle digital data, in addition to a process of simply converting the analog data into the digital data. The easy-to-handle digital data is data whose data size has been reduced by compressing the amount of information. The sensor signal processing unit 1122 may be configured to generate, for example, JPEG format, GIF format, or MPEG format data from RAW data.

The sensor signal processing unit 1122 outputs the digital data to both the vehicle control unit 3 and the cleaner control unit 1116. Here, the same digital data is output to the vehicle control unit 3 and the cleaner control unit 1116.

The cleaner control unit 1116 includes a dirt detection unit 1123 that detects the presence or absence of the dirt on the external sensor 6 from the digital data output from the sensor signal processing unit 1122. The dirt detection unit 1123 determines that there is dirt, in a case Where there is a signal of the same intensity at the same position over a predetermined period, for example. When it is determined that there is the dirt, the cleaner control unit 1116 operates the cleaner unit 110 to clean the corresponding external sensor 6.

In the present embodiment, the cleaner control unit 1116 is electrically connected to the vehicle control unit 3. The cleaner control unit 1116 can notify the vehicle control unit 3 that the dirt is generated in the case where the dirt is detected, thereby notify that the accuracy of the output from the sensor signal processing unit 1122 at the time is low.

The vehicle control unit 3 may also be configured to transmit the outputs such as a vehicle speed sensor 1124, a cleaner operation operator 1125 operable by an occupant, the wireless communication unit 10, and the GPS 9 or the like to the cleaner control unit 1116. With such a configuration, an execution frequency of the dirt detection unit 1123 can be adjusted in accordance with the vehicle speed, for example. The cleaner control unit 1116 can be configured to operate the cleaner unit 110 when a turning-on signal, is received from the cleaner operation operator 1125. Alternatively, the cleaner unit 110 may be operated or the dirt detection process by the dirt detection unit 1123 may be executed in a case where the outputs of the wireless communication unit 10, the GPS 9, or the like gives the information indicating that the host vehicle has entered/is entering the area where the automatic driving is possible, for example.

According to the vehicle cleaner system 1100 according to the present embodiment, the dirt detection unit 1123 is not provided in the sensor signal processing unit 1122, and is provided m the cleaner control unit 1116.

When the analog signal of the sensor element 1121 is converted into the digital signal or the digital signal is converted into a more easy-to-handle digital signal, a large calculation load is generated. When the signal output from the external sensor 6 is generated in this manner, it is required to perform processing rapidly.

On the other hand, since the image processing is also executed in order to detect the dirt, a certain calculation load is generated. However, the detection of the dirt is not always required to be performed. When the signal output from the external sensor 6 is generated, it is necessarily to execute the image processing for all the frames, while necessity for executing dirt detection processing for all the frames is low.

Therefore, in the present embodiment, the dirt detection unit 1123 is provided in the cleaner control unit 1116 such that the sensor signal processing unit 1122 and the dirt detection unit 1123 that generate the signals output from the external sensor 6 are separately provided. Since the sensor signal processing unit 1122 does not execute the dirt detection processing, a processing load of the sensor signal processing unit 1122 is small. Therefore, the maximum processing load required for the sensor signal processing unit 1122 can be reduced, and an excessive calculation processing capacity is not required for the sensor signal processing unit 1122.

In addition, it is preferable that the cleaner control unit 1116 operates the cleaner unit 110 when the object to be cleaned is dirty. Therefore, it is preferable that the cleaner control unit 1116 includes the dirt detection unit 1123.

For the reasons described above, the vehicle cleaner system 1100 of the present embodiment is suitable for the vehicle 1 including the vehicle control unit 3 capable of executing the automatic driving mode.

It is preferable that the vehicle cleaner system 1100 of the present embodiment is particularly used in combination with a vehicle cleaner system configured to operate the cleaner unit 110 and/or diagnose the dirt before the output of the external sensor 6 is necessary. According to such a configuration, since it is not necessary for the dirt detection unit 1123 to suddenly detect the dirt, the maximum processing load of the cleaner control unit 1116 including the dirt detection unit 1123 can be reduced, and an excessive calculation processing capacity is not required for the cleaner control unit 1116.

The vehicle control unit 3 may be configured to further perform the image processing, on the digital data (primary digital data) acquired from the sensor signal processing unit 1122 to generate digital data (secondary digital data) having a small data size, and determine at least one of the other vehicle, the pedestrian, the wall, and the fallen object based on the digital data having the small data size. According to such a configuration, it is possible to reduce the calculation load when discriminating the other vehicle, the pedestrian, the wall, the fallen object, or the like by the vehicle control unit 3. In addition, since the sensor signal processing unit 1122 is not required to have a calculation load required to generate the secondary digital data, a large calculation processing capability is not required for the sensor signal processing unit 1122.

In the vehicle cleaner system 1100 of the present embodiment, the cleaner control unit 1116 is connected to the plurality of sensor signal processing units 1122, respectively. Since the cleaner control unit 1116 acquires signals from the plurality of sensor signal processing units 1122, it is easy to determine the presence or absence of the dirt by comparing the outputs of the plurality of external sensors 6. For example, if the same signal is obtained for the same area from the plurality of external sensors 6, it can be determined that it is some kind of object rather than the dirt. In this manner, the accuracy of the dirt determination can be increased by comparing the outputs of the plurality of external sensors 6.

In the vehicle air cleaner system 1100 of the present embodiment, the cleaner control unit 1116 is connected to the plurality of cleaner units 110, Therefore, the cleaner control unit 1116 can control the plurality of cleaner units 110 in conjunction with each other. For example, in the case where it is determined that the external sensor 6 including the dirt detection unit 1123 is dirty, there is a possibility that the other external sensors 6 are also dirty. Accordingly, the cleaner control unit 1116 can be configured to operate the cleaner unit 110 that cleans the external sensor 6 in which the dirt has been detected, and also to operate the cleaner unit 110 that cleans the external sensor 6 in which the dirt is not detected. Alternatively, the cleaner control unit 1116 can be configured to operate the cleaner unit 110 that cleans the external sensor 6 in which the dirt has been detected, and also to operate the cleaner unit 110 that cleans the external sensor 6 that has not detected the dirt.

In the vehicle cleaner system 1100 of the present embodiment, the cleaner control unit 1116 is connected to the plurality of sensor signal processing units 1122 and the plurality of cleaner units 110. It is possible to detect dirt on each of the external sensors 6 and operate or not to operate the cleaner unit 110 depending on the presence or absence of the dirt.

Fourth Embodiment

Figure 13:
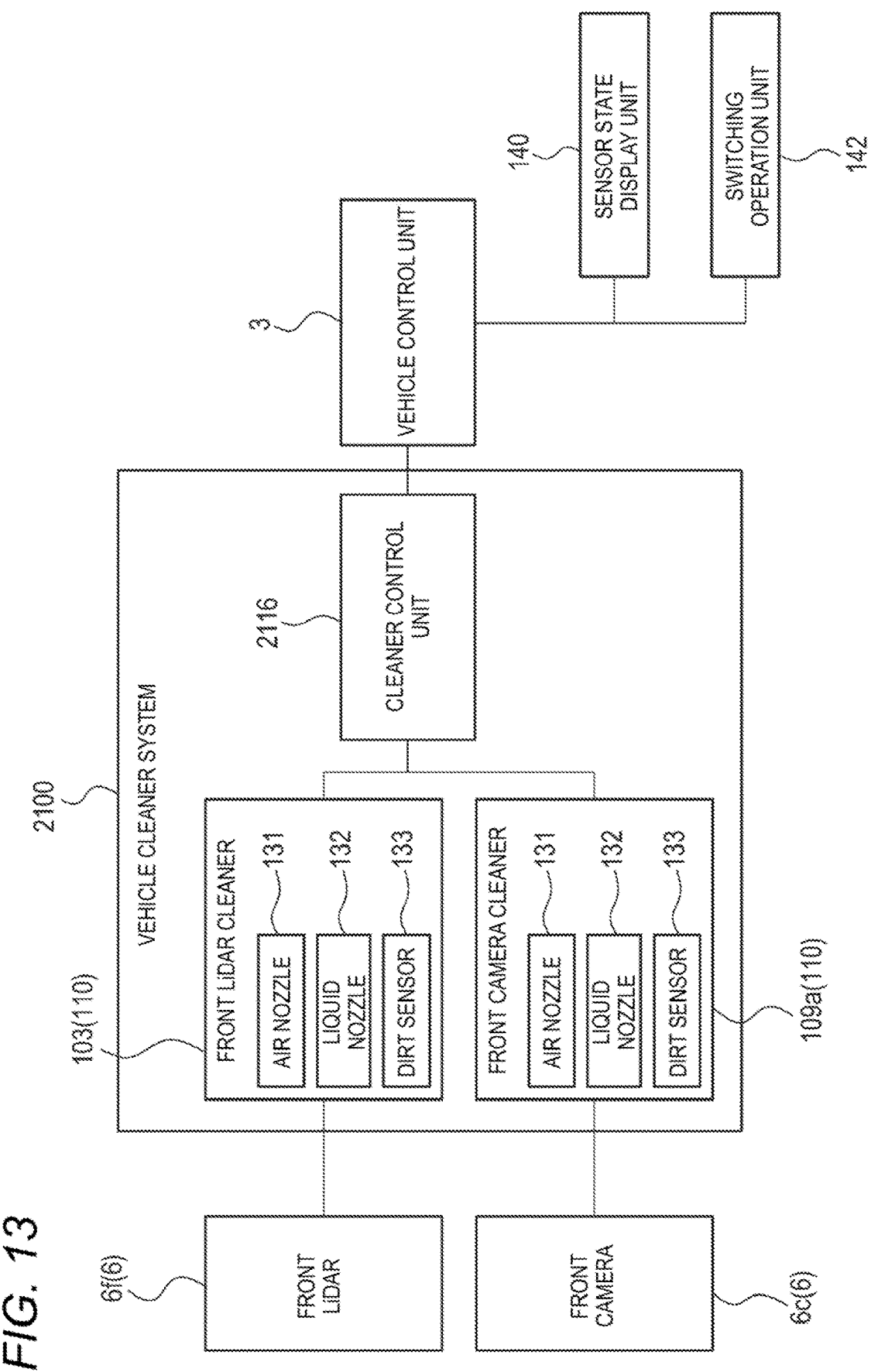
FIG. 13 is a block diagram of a main part of a vehicle cleaner system according to a fourth embodiment of the present invention.

FIG. 13 is a block diagram of a main part of a vehicle cleaner system 2100 according to a fourth embodiment of the present invention. As shown in FIG. 13, the vehicle cleaner system 2100 includes the cleaner units 110 that clean the external sensors 6, and a cleaner control unit 2116 that controls the operation of the cleaner unit 110. Although only the front LC 103 and the front camera cleaner 109*a* are shown as the cleaner unit 110 in FIG. 13, it is needless to say that the vehicle cleaner system 2100 includes the other cleaner units 110 as in the vehicle cleaner system 100 shown in FIG. 3.

The front LC 103 and the front camera cleaner 109*a* each have the air nozzle 131 that discharges air (for example, high-pressure air) as the cleaning medium to the external sensor 6, the liquid nozzle 132 that discharges the cleaning liquid as the cleaning medium to the external sensor 6, and the dirt sensor 133 that detects the dirt on the external sensor 6. Specifically, the front LC 103 includes the air nozzle 131 that discharges air as the cleaning medium to the front LiDAR 6*f*, the liquid nozzle 132 that discharges the cleaning liquid as the cleaning medium to the front LiDAR (if, and the dirt sensor 113 that detects the dirt on the front LiDAR 6*f*. Similarly, the front camera cleaner 109*a* and the other cleaner unit 110 also include the air nozzle 131, the liquid nozzle 132, and the dirt sensor 133.

The cleaner control unit 2116 is connected to the front LC 103 and the front camera cleaner 109*a*, respectively. The cleaner control unit 2116 is configured to control each cleaner unit 110. A configuration of the cleaner control unit 2116 is the same as that of the cleaner control unit 116 of the vehicle cleaner system 100, and therefore a detailed description thereof will be omitted.

In the present embodiment, the cleaner control unit 2116 receives a detection signal (for example, a dirt signal) from the dirt sensor 133, determines whether the external sensor 6 is in a clean state, and generates a non-cleaning signal in a case where the external sensor 6 is not in the clean state.

In the present embodiment, the cleaner control unit 2116 is connected to the vehicle control unit 3. The vehicle control unit 3 is connected to a sensor state display unit 140 and a switching operation unit 142. The sensor state display unit 140 is a display device that displays the state of the external sensor 6 (in particular, whether or not it is in the clean state). The sensor state display unit 140 can be configured by a lamp, a display, or the like, for example. The switching operation unit 142 is an operator operated by the user to cause the vehicle control unit 3 to execute the automatic driving mode. The switching operation unit 142 can be configured by a button, a switch, a lever, a touch display, or the like. The sensor state display unit 140 may be integrated with the switching operation unit 142.

In the present embodiment, when acquiring the non-cleaning signal from the cleaner control unit 2116, the vehicle control unit 3 causes the sensor state display unit 140 to display to indicate the external sensor 6 is not in the clean state. In this state, when the switching operation unit 142 is operated and a signal for executing the automatic driving mode is input to the vehicle control unit 3, the vehicle control unit 3 executes the automatic driving mode.

Figure 14:
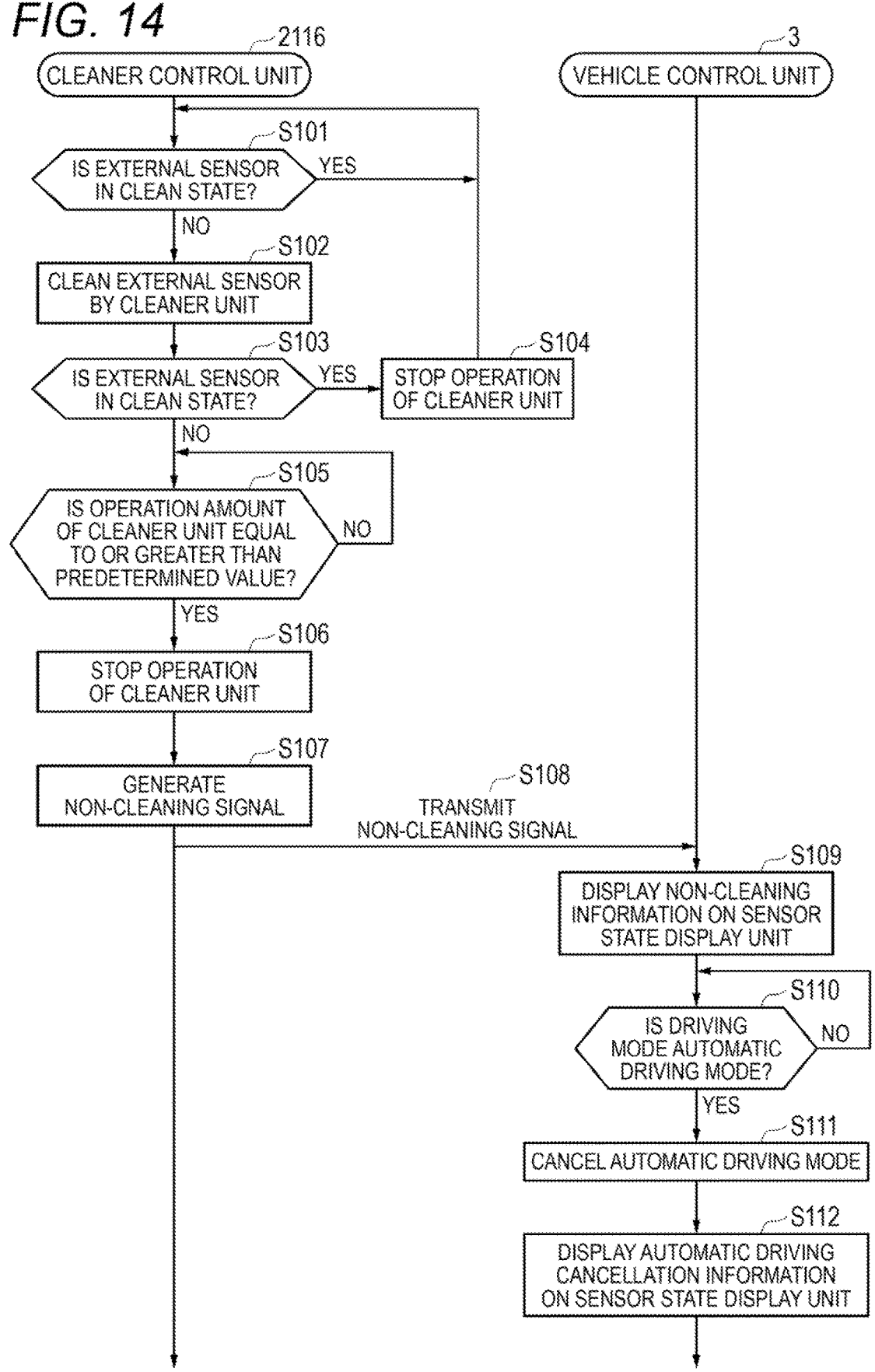
FIG. 14 is a flowchart executed by the vehicle cleaner system according to the fourth embodiment.

FIG. 14 is a flowchart showing an example of a process executed by the cleaner control unit 2116.

As shown in FIG. 14, in step S101, the cleaner control unit 2116 determines whether or not the external sensor 6 is in the clean state based on the output of the dirt sensor 133. For example, the cleaner control unit 2116 determines whether or not the front LiDAR 6f is in the clean state in accordance with the output of the dirt sensor 133 that detects the dirt of the front LiDAR 6f. Alternatively, the front LC 103 may be configured to transmit a signal notifying whether or not the front LiDAR 6f needs to be cleaned to the cleaner control unit 2116 in accordance with the Output of the dirt sensor 133, and the cleaner control unit 2116 may be configured to determine whether or not the front LiDAR 6f is in the clean state in accordance with the signal of the front LC 103, Similarly to the front LC 103, the cleaner control unit 2116 determines whether or not the external sensor 6 to be cleaned is in the clean state for the other cleaner units 110.

In a case Where it is determined in step S101 that the external sensor 6 is in the clean state (Yes in step S101), the cleaner control unit 2116 repeats the process of step S101 until it is determined that the external sensor 6 is not in the clean state.

On the other hand, in a case where it is determined in step S101 that the external sensor 6 is not in the clean state (No in step S101), in step S102, the cleaner control unit 2116 drives the cleaner unit 110 to clean the external sensor 6. For example, after the cleaning liquid is discharged from the liquid nozzle 132 toward the external sensor 6, the cleaner control unit 2116 discharges the air from the air nozzle 131 toward the external sensor 6.

Figure 15:
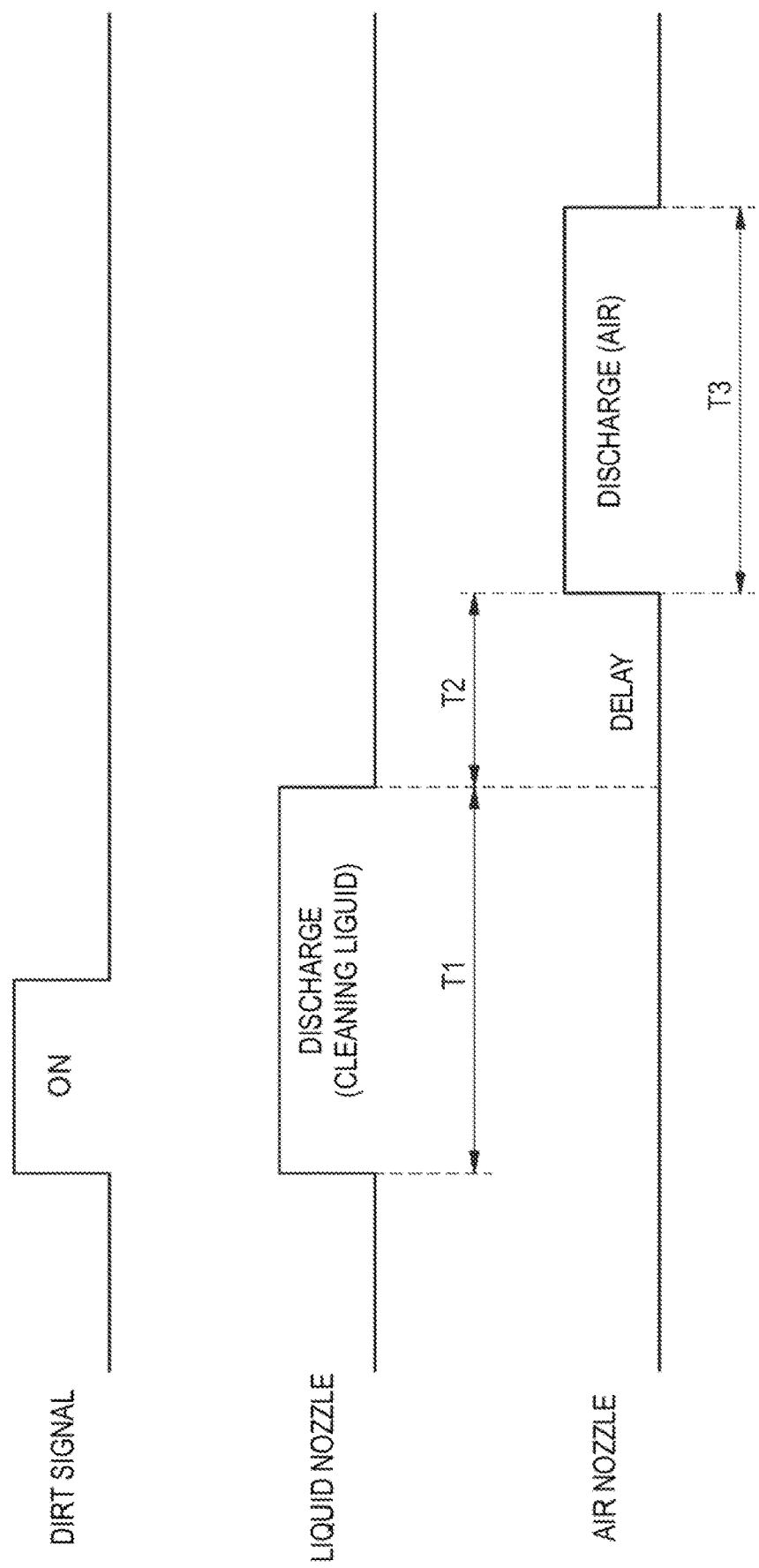
FIG. 15 is a view showing a timing of cleaning of a cleaner unit executed by the vehicle cleaner system according to the fourth embodiment.

Specifically, as shown in FIG. 15, the cleaner control unit 2116 starts discharging the cleaning liquid from the liquid nozzle 132 based on the dirt signal output from the dirt sensor 133. Discharge time T1 of the cleaning liquid discharged from the liquid nozzle 132 based on a single camera dirt signal can be set optionally. The cleaner control unit 2116 discharges air (for example, high-pressure air) from the air nozzle 131 after a lapse of predetermined time T1 from a time point when the cleaning of the external sensor 6 is completed, based on the discharge time T1 of the cleaning liquid from the liquid nozzle 132. The discharge of the air is performed with a delay of the time T2 from the time point when the cleaning of the external sensor 6 by the discharge of the cleaning liquid is completed. Air discharge time T3 from the air nozzle 131 can be set optionally. According to such a method, the dirt of the external sensor 6 can be cleaned with the cleaning liquid, and further the cleaning liquid adhered to the external sensor 6 can be blown away by the air, so that the external sensor 6 can be brought into the clean state.

In step S102, the cleaner control unit 2116 may drive at least one of the cleaner units 110, or may operate all the cleaner units 110. However, since the sensitivity of the external sensor 6 that acquires the external information in front is required when the automatic driving mode is executed, it is preferable to operate at least the front camera cleaner 109a for cleaning the front camera 6c that acquires the information on the front side of the vehicle and the front LC 103 for cleaning the front LiDAR 6f.

Next, in step S103, the cleaner control unit 2116 determines again whether or not the external sensor 6 is in the clean state based on the output from the dirt sensor 133. In a case where it is determined in step S103 that the external sensor 6 is in the clean state (Yes in step S103), in step S104, the cleaner control unit 2116 stops an operation of the cleaner unit 110 and returns the process to step S101.

Figure 16:
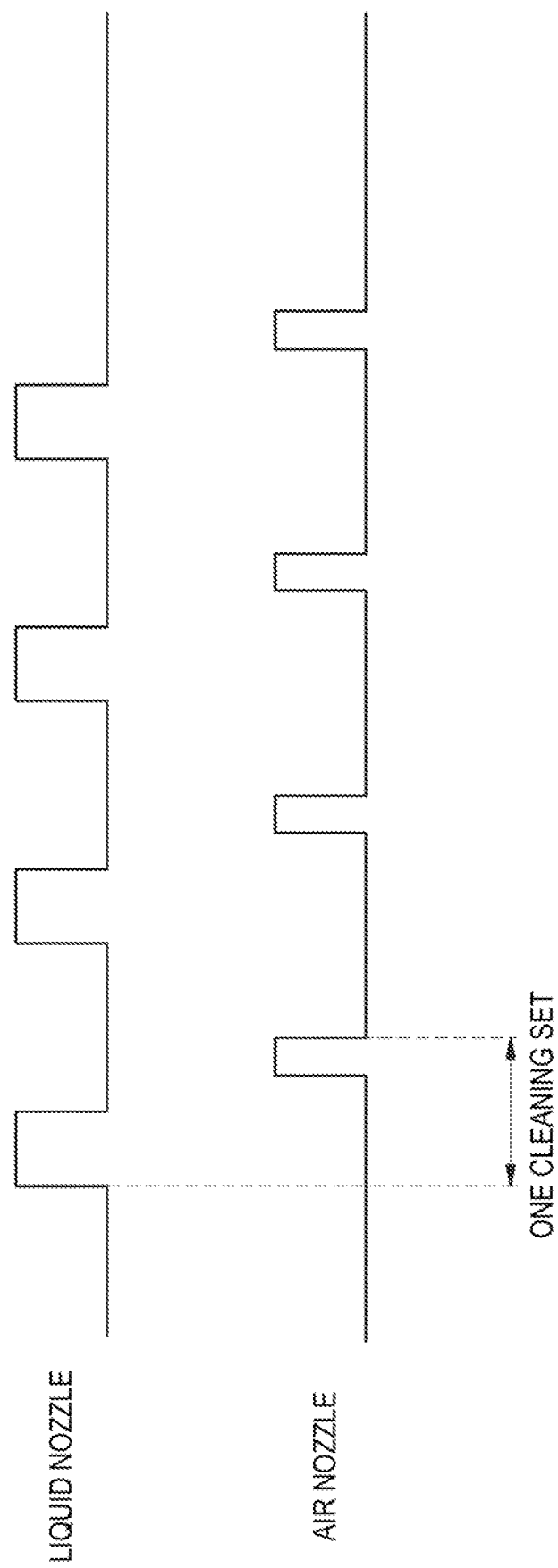
FIG. 16 is a view showing a timing of cleaning of a cleaner unit executed by a vehicle cleaner system according to a modification of the fourth embodiment.

On the other hand, in a case where it is determined in step S103 that the external sensor 6 is not in the clean state, that is, it is determined that the external sensor 6 is still dirty after the cleaning by the cleaner unit 110 (No in step S103), in step S105, the cleaner control unit 2116 determines whether an operation amount of the cleaner unit 110 is equal to or greater than a predetermined value. The cleaner control unit 2116 determines whether or not operation amount of the cleaner unit 110, for example, a discharge amount of the cleaning liquid discharged from the liquid nozzle 132 toward the external sensor 6 is equal to or greater than the predetermined value. Incidentally, the cleaner control unit 2116 may determine whether or not at least one of the number of times of discharge of the cleaning liquid, the number of times of discharge per unit time of the cleaning liquid, and the discharge time of the cleaning liquid is equal to or greater than a predetermined value, instead of the discharge amount of the cleaning liquid. In addition, as shown in FIG. 16, in a case where at least one discharge of the cleaning liquid from the liquid nozzle 132 and at least one subsequent discharge of the air from the air nozzle 131 are set as one cleaning set, and the number of times of performing the cleaning set is equal to or greater than a predetermined number of times (for example, in a case where the number of times of performing the cleaning set has exceeded four times), it may be determined that the operation amount of the cleaner unit 110 is equal to or greater than the predetermined value.

In the case where it is determined in step S105 that the operation amount of the cleaner unit 110 is equal to or greater than the predetermined value (Yes in step S105), in step S106, the cleaner control unit 2116 stops the operation of the cleaner unit 110.

Subsequently, in step S107, the cleaner control unit 2116 generates the non-cleaning signal indicating that the external sensor 6 is not in the clean state. The non-cleaning signal may include information on which external sensor 6 of the plurality of external sensors 6 is not in the clean state. In step S108, the cleaner control unit 2116 transmits the generated non-cleaning signal to the vehicle control unit 3.

In step S109, the vehicle control unit 3 that has acquired the non-cleaning signal transmitted from the cleaner control unit 2116 displays non-cleaning information indicating, that the external sensor 6 is not in the clean state on the sensor state display unit 140. In a case where the information on which external sensor 6 out of the plurality of external sensors 6 is not in the clean state is included in the non-cleaning signal acquired from the cleaner control unit 2116, the vehicle control unit 3 may include information indicating which external sensor 6 is not in the clean state in the non-cleaning information displayed on the sensor state display unit 140.

In step S110, the vehicle control unit 3 determines whether or not the current driving mode is the automatic driving mode. In a case where it is determined that the current driving mode is the automatic driving mode (Yes in step S110), the vehicle control unit 3 cancels the automatic driving mode in step S111. That is, the vehicle control unit 3 switches the driving mode from the automatic driving mode to a manual mode. In step S112, the vehicle control unit 3 causes the sensor state display unit 140 to display the automatic driving cancellation information indicating that the automatic driving mode has been canceled. The automatic driving cancellation information may include information indicating that the driving mode is switched from the automatic driving mode to the manual driving mode. As a result, the user of the vehicle 1 can recognize that the automatic driving mode has been canceled because the external sensor 6 is not in the clean state even after cleaning.

As described above, according to the vehicle cleaner system 2100 according to the present embodiment, the cleaner control unit 2116 is configured to clean the external sensor 6 by the cleaner unit 110 based on the dirt signal from the dirt sensor 133, after the external sensor 6 is cleaned, determine whether or not the external sensor 6 is in the clean state, even when determining that the external sensor 6 is not in the clean state, and stop the operation of the cleaner unit 110 when the operation amount of the cleaner unit 110 is equal to or greater than the predetermined value. According to this configuration, it is possible to suppress the wear of the cleaner unit 110 and the consumption of the cleaning liquid for keeping the external sensor 6 in the clean state.

According to the vehicle cleaner system 2100 according to the present embodiment, the cleaner control unit 2116 is configured to, its the case where at least one of the discharge amount of the cleaning medium, the number of times of discharge of the cleaning medium, the number of times of discharge per unit time of the cleaning medium, and the discharge time of the cleaning medium is equal to or more than the predetermined value, determine that the operation amount of the cleaner unit 110 is equal to or greater than the predetermined value. As described above, by determining an operating condition of the cleaner unit 110 from when it is determined that the external sensor 6 is not in the clean state after the external sensor 6 is cleaned to when the operation of the cleaner unit 110 is stopped, it is efficient that the cleaning of the external sensor 6 is not repeated more than necessary.

According to the vehicle cleaner system 2100 according to the present embodiment, the cleaning medium includes the cleating liquid and air, and the cleaner control, unit 2116 is configured to, in the case where at least one discharge of the cleaning liquid and at least one subsequent discharge of the air are set as one cleaning set, and the number of times of performing the cleaning set is equal to or greater than the predetermined number of times, determine that the operation amount of the cleaner unit 110 is equal to or greater than the predetermined value. Even if the operating condition of the cleaner unit 110 is determined in this manner, the cleaning of the external sensor 6 is not repeated more than necessary, which is efficient.

According to the vehicle cleaner system 2100 according to the present embodiment, the cleaner control unit 2116 is configured to, in the case Where it is determined that the external sensor 6 is not in the clean state, output the non-cleaning signal indicating that the external sensor 6 is not in the clean state to the vehicle control unit 3. As described above, in the case where the external sensor 6 is not in the clean state even if the external sensor 6 is cleaned under a predetermined condition by the cleaner unit 110, the cleaner control unit 2116 can transmit necessary information to the vehicle control unit 3 in accordance with the clean state of the external sensor 6 by outputting the non-cleaning signal to the vehicle control unit 3.

According to the vehicle cleaner system 2100 according to the present embodiment, the vehicle control unit 3 is configured to cause the sensor state display unit 140 to display to indicate the external sensor 6 is not in the clean state based on the non-cleaning signal received from the cleaner control unit 2116. As described above, by displaying the clean state of the external sensor 6 on the sensor state display unit 140, the user of the vehicle 1 can be clearly notified of the clean state of the external sensor 6.

According to the vehicle cleaner system 2100 according to the present embodiment, the vehicle control unit 3 can selectively execute the automatic driving mode and the manual driving mode, and the vehicle control unit 3 is configured to switch the driving mode from the automatic driving mode to the manual driving mode based on the non-cleaning signal received from the cleaner control unit 2116. As described above, in the case where the external sensor 6 is not in the clean state, the automatic driving mode is canceled, so that the information on the outside of the vehicle is not acquired even when the external sensor 6 is in a dirty state. Therefore, erroneous detection of the external sensor 6 can be prevented.

Figure 17:
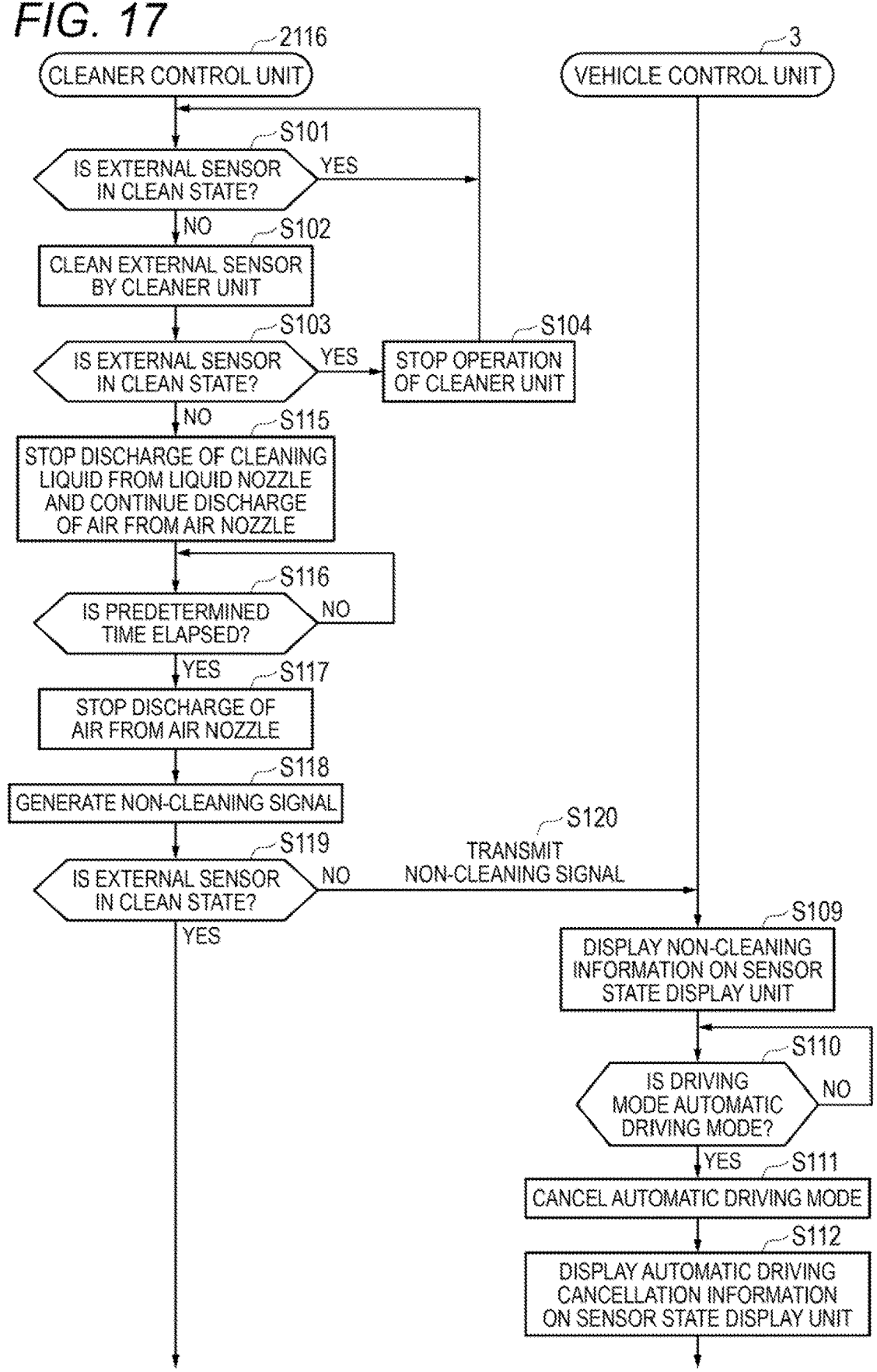
FIG. 17 is a flowchart executed by a vehicle cleaner system according to another modification of the fourth embodiment.

FIG. 17 is a flowchart showing a modification of the process executed by the cleaner control unit 2116.

In the modification shown in FIG. 17, the steps S101 to S104 are the same as that in the example of the process shown in FIG. 14, and therefore a description thereof will be omitted.

In the case where it is determined in step S103 that the external sensor 6 is not in the clean state (No in step S103), in step S115, the cleaner control unit 2116 controls the cleaner unit 110 so as to stop the discharge of the cleaning liquid from the liquid nozzle 132 toward the external sensor 6 that is determined not to be in the clean state and continue the discharge of the air from the air nozzle 131 toward the external sensor 6. At this time, the cleaner control unit 2116 may control the cleaner unit 110 to continuously discharge the air from the air nozzle 131, or may control the cleaner unit 110 to intermittently discharge the air from the air nozzle 131.

Next, in step S116, the cleaner control unit 2116 determines whether or not predetermined time has elapsed after the start of the discharge of the air from the air nozzle 131. In a case where it is determined that the predetermined time has elapsed (Yes in step S116), in step S117, the cleaner control unit 2116 controls the cleaner unit 110 to stop the discharge of the air from the air nozzle 131. In this manner, the operation of the cleaner unit 110 is stopped.

Next, in step S118, the cleaner control unit 2116 generates the non-cleaning signal indicating that the external sensor 6 is not in the clean state. Next, in step S119, the cleaner control unit 2116 determines whether or not the external sensor 6 is in the clean state. In a case where it is determined that the external sensor 6 is not in the clean state (No in step S119), in step S120, the cleaner control unit 2116 transmits the non-cleaning signal generated in step S118 to the vehicle control unit 3.

In the modification shown in FIG. 7, the steps S109 to S112 are the same as that in the example of the process shown in FIG. 14, and therefore a description thereof will be omitted. Note that the order of steps S118 and S119 may be reversed. That is, after the discharge of the air from the air nozzle 131 is stopped (step S117), the cleaner control unit 2116 may determine whether the external sensor 6 is in the dean state, generate the non-cleaning signal in the case where the external sensor 6 is not in the clean state, and transmit the non-cleaning signal to the vehicle control unit 3. As described above, by confirming the clean state of the external sensor 6 before and after generating the non-cleaning signal, it is possible to prevent the non-cleaning signal from being transmitted to the vehicle control unit 3 even when the external sensor 6 is in the clean state by continuing the discharge of the air from the air nozzle 131.

As described above, according to the vehicle cleaner system 2100 according to the present modification, the cleaner control unit 2116 cleans the external sensor 6 by discharging the cleaning liquid toward the external sensor 6 based on the dirt signal, and then discharging the air toward the external sensor 6. Further, the cleaner control unit 2116 is configured to, in the case where the external sensor 6 is not in the clean state, stop the discharge of the cleaning liquid, continue to discharge air for the predetermined time, and stop the operation of the cleaner unit 110 by determining that the operation amount of the cleaner unit 110 is equal to or greater than the predetermined value after the lapse of the predetermined time and stopping the discharge of the air. According to this configuration, in the case where it is determined that the external sensor 6 is not in the clean state after the external sensor 6 is cleaned, the cleaning of the external sensor 6 can be continued while suppressing the consumption of the cleaning liquid by continuing the discharge of the air while stopping the discharge of the cleaning liquid. In addition, by stopping the discharge of air after the lapse of the predetermined time, it is possible to prevent the cleaner unit 110 from being operated more than necessary, and to suppress the wear of the cleaner unit 110.

Fifth Embodiment

Figure 18:
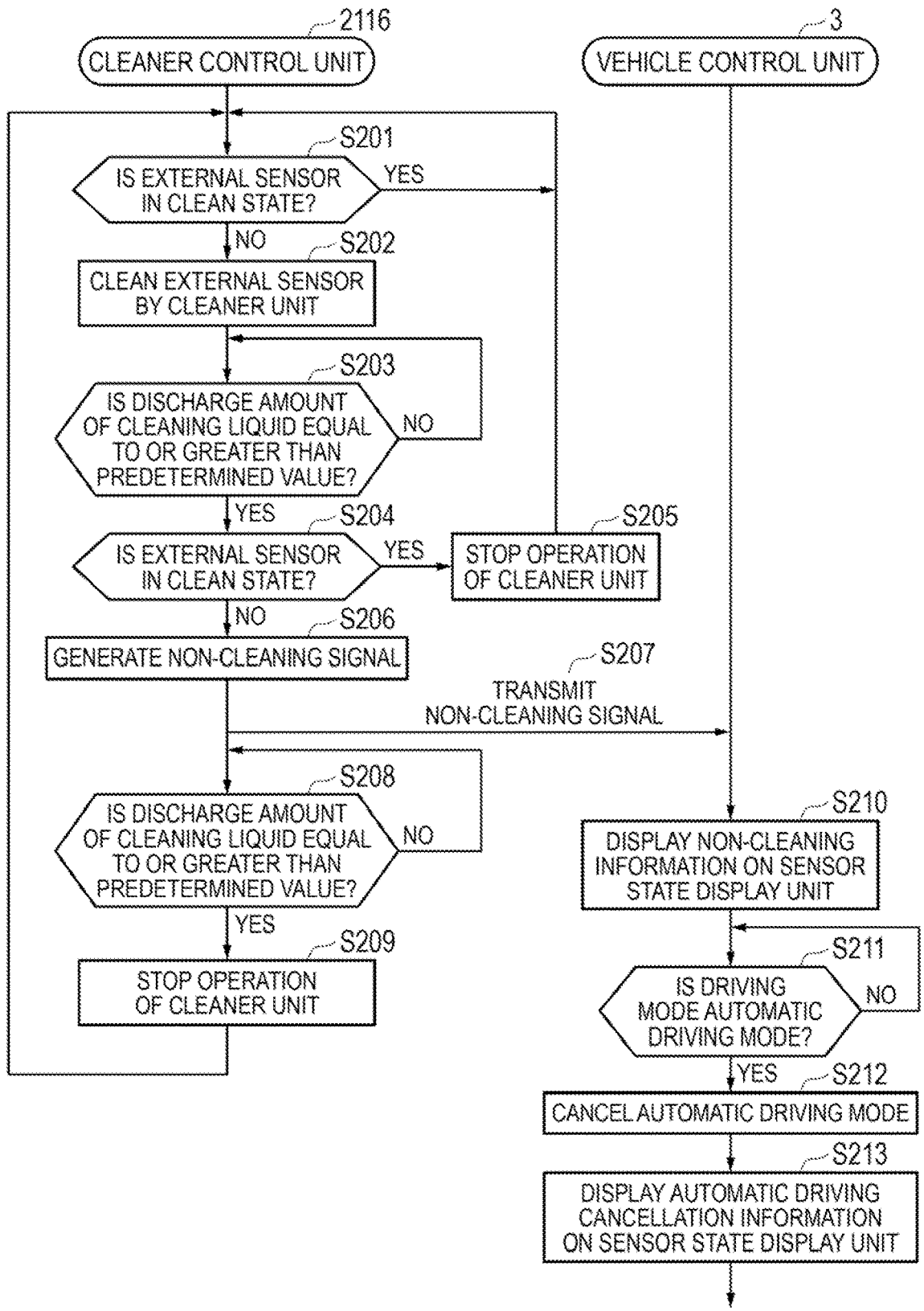
FIG. 18 is a flowchart executed by a vehicle cleaner system according to a fifth embodiment of the present invention.

FIG. 18 is a flowchart executed by the cleaner control unit 2116 according to a fifth embodiment of the present invention. The configuration of the cleaner control unit 2116 according to the fifth embodiment is the same as that of the cleaner control unit 2116 according to the fourth embodiment, and a detailed description thereof is omitted.

As shown in FIG. 18, in step S201, the cleaner control unit 2116 determines whether or not the external sensor 6 is in the clean state based on the output of the dirt sensor 133. For example, the cleaner control unit 2116 determines whether or not the front LiDAR 6f is in the clean state in accordance with the output of the dirt sensor 133 that detects the dirt of the front LiDAR 6f. Alternatively, the front LC 103 may be configured to transmit a signal notifying whether or not the front LiDAR 6f needs to be cleaned to the cleaner control unit 2116 in accordance with the output of the dirt sensor 133, and the cleaner control unit 2116 may be configured to determine whether or not the front LiDAR 6f is in the clean state in accordance with the signal of the front LC 103. Similarly to the front LC 103, the cleaner control unit 2116 determines whether or not the external sensor 6 to be cleaned is in the clean state for the other cleaner units 110.

In a case where it is determined in step S201 that the external sensor 6 is in the clean state (Yes in step S201), the cleaner control unit 2116 repeats the process of step S201 until it is determined that the external sensor 6 is not in the clean state.

On the other hand, in a case where it is determined in step S201 that the external sensor 6 is not in the clean state (No in step S201), in step S202, the cleaner control unit 2116 drives the cleaner unit 110 to clean the external sensor 6. For example, the cleaner control unit 2116 may discharge the cleaning liquid from the liquid nozzle 132 toward the external sensor 6 and then discharge the air from the air nozzle 131 toward the external sensor 6. According to this method, the dirt on the external sensor 6 can be cleaned with the cleaning liquid, and the cleaning liquid adhered to the external sensor 6 can be blown away by the air, so that the external sensor 6 can be cleaned.

In step S202, the cleaner control unit 2116 may drive at least one of the cleaner units 110, or may operate all the cleaner units 110. However, since the sensitivity of the external sensor 6 that acquires the external information in front is required when the automatic driving mode is executed, it is preferable to operate at least the front camera cleaner 109a for cleaning the front camera 6c that acquires the information on the front side of the vehicle and the front LC 103 for cleaning the front LiDAR 6f.

Next, in step S203, the cleaner control unit 2116 determines whether or not the discharge amount of the cleaning liquid discharged from the liquid nozzle 132 of the cleaner unit 110 toward the external sensor 6 is equal to or greater than the predetermined value. Incidentally, the cleaner control unit 2116 may determine whether or not at least one of the number of times of discharge of the cleaning liquid, the number of times of discharge per unit time of the cleaning liquid, and the discharge time of the cleaning liquid is equal to or greater than the predetermined value, instead of the discharge amount of the cleaning liquid.

In a case where it is determined in step S203 that the discharge amount of the cleaning liquid is equal to or greater than the predetermined value (Yes in step S203), in step S204, the cleaner control unit 2116 determines again whether or not the external sensor 6 is in the clean state based on the output from the dirt sensor 133. In the case where it is determined in step S204 that the external sensor 6 is in the clean state (Yes in step S204), in step S205, the cleaner control unit 2116 stops the operation of the cleaner unit 110 and returns the process to step S201.

On the other hand, in the case where it is determined in step S204 that the external sensor 6 is not in the clean state, that is, in the case where it is determined that the external sensor 6 is still dirty after the cleaning by the cleaner unit 110 (No in step S204), in step S206, the cleaner control unit 2116 generates the non-cleaning signal indicating that the external sensor 6 is not in the clean state. The non-cleaning signal may include information on which external sensor 6 of the plurality of external sensors 6 is not in the clean state. In step S207, the cleaner control unit 2116 transmits the generated non-cleaning signal to the vehicle control unit 3.

Next, in step S208, after it is determined that the external sensor 6 is not in the clean state, the cleaner control unit 2116 determines whether or not the discharge amount of the cleaning liquid discharged from the liquid nozzle 132 of the cleaner unit 110 toward the external sensor 6 is equal to or greater than the predetermined value. Similar to step S203, the cleaner control unit 2116 may determine whether at least one of the number of times of discharge of the cleaning liquid, the number of times of discharge per unit time of the cleaning liquid, and the discharge time of the cleaning liquid is equal to or greater than the predetermined value, instead of the discharge amount of the cleaning liquid.

In the case where it is determined in step S208 that the discharge amount of the cleaning liquid is equal to or greater than the predetermined value (Yes in step S203), in step S209, the cleaner control unit 2116 stops the operation of the cleaner unit 110 and returns the process to step S201.

In step S210, the vehicle control unit 3 that has acquired the non-cleaning signal transmitted from the cleaner control unit 2116 in step S207 displays the non-cleaning information indicating that the external sensor 6 is not in the clean state on the sensor state display unit 140. Incidentally, in the case where the information on which external sensor 6 out of the plurality of external sensors 6 is not in the clean state is included in the non-cleaning signal acquired from the cleaner control unit 2116, the vehicle control unit 3 may include the information indicating which external sensor 6 is not in the clean state in the non-cleaning information displayed on the sensor state display unit 140.

In step S211 the vehicle control unit 3 determines whether or not the current driving mode is the automatic driving mode. In the case where it is determined in step S211 that the current driving mode is the automatic driving mode (Yes in step S211), the vehicle control unit 3 cancels the automatic driving mode in step S212. That is, the vehicle control unit 7 switches the driving mode from the automatic driving mode to the manual mode.

In step S213, the vehicle control unit 3 displays the automatic driving cancellation information indicating that the automatic driving mode has been canceled on the sensor state display unit 140. The automatic driving cancellation information may include the information indicating that the driving mode is switched from the automatic driving mode to the manual driving mode. As a result, the user of the vehicle 1 can recognize that the automatic driving mode has been canceled because the external sensor 6 is not in the clean state even after cleaning.

As described above, according to the vehicle cleaner system 2100 according to the present embodiment, the cleaner control unit 2116 cleans the external sensor 6 by the cleaner unit 110 based on the output from the dirt sensor 133, and in a case where the cleaning of the external sensor 6 by the cleaner unit 110 satisfies the predetermined condition, determines whether or not the external sensor 6 is in the clean state. Further, when the cleaner control unit 2116 determines that the external sensor 6 is not in the clean state, the cleaner control unit 2116 is configured to output the non cleaning signal (first non-cleaning signal) indicating that the external sensor 6 is not in the clean state to the vehicle control unit 3. As described above, in the case where the external sensor 6 is not in the clean state even if the external sensor 6 is cleaned under a predetermined condition by the cleaner unit 110, the cleaner control unit 2116 can transmit necessary information to the vehicle control unit 3 in accordance with the clean state of the external sensor 6 by outputting the non-cleaning signal to the vehicle control unit 3.

According to the vehicle cleaner system 2100 according to the present embodiment, the cleaner control unit 2116 is configured to, when at least one of the discharge amount of the cleaning liquid from the cleaner unit 110, the number of times of discharge of the cleaning liquid, the number of times of discharge per unit time of the cleaning liquid, and the discharge time of the cleaning liquid is equal to or greater than the predetermined value, determine whether or not the external sensor 6 is in the clean state, and when it is determined that the external sensor 6 is not m the clean state, output the non-cleaning signal is output to the vehicle control unit 3. As described above, by determining the operating condition of the cleaner unit 110 from when the cleaning of the external sensor 6 is started by the cleaner unit 110 to when the clean state of the external sensor 6 is determined, the processing for determining the clean state of the external sensor 6 is easy, and it is efficient that the cleaning of the external sensor 6 is not repeated more than necessary.

According to the vehicle cleaner system 2100 according to the present embodiment, the vehicle 1 includes the sensor state display unit 140 that can present the clean state of the external sensor 6 to the user, and the vehicle control unit 3 is configured to cause the sensor state display unit 140 to display to indicate the external sensor 6 is not in the clean state based on the first non-cleaning signal received from the cleaner control unit 2116. As described above, by displaying the clean state of the external sensor 6 on the sensor state display unit 140, the user of the vehicle 1 can be clearly notified of the clean state of the external sensor 6.

According to the vehicle cleaner system 2100 according to the present embodiment, the vehicle control unit 3 can selectively execute the automatic driving mode and the manual driving mode, and the vehicle control unit 3 is configured to switch the driving mode from the automatic driving mode to the manual driving mode based on the first non-cleaning signal received from the cleaner control unit 2116. As described above, in the case where the external sensor 6 is not in the clean state, the automatic driving mode is canceled, so that the information on the outside of the vehicle is not acquired even when the external sensor 6 is in the dirty state. Therefore, the erroneous detection of the external sensor 6 can be prevented.

According to the vehicle cleaner system 2100 according to the present embodiment, the cleaner control unit 2116 is further configured such that the operation of the cleaner unit 110 is stopped when it is determined that the external sensor 6 is not in the clean state after the external sensor 6 is cleaned. As described above, when the external sensor 6 cannot be completely cleaned even when the external sensor 6 is cleaned, by stopping the operation of the cleaner unit 110, the cleaning of the external sensor 6 is not repeated more than necessary, so that the wear of the cleaner unit 110 and the consumption of the cleaning liquid can be suppressed.

According to the vehicle cleaner system 2100 according to the present embodiment, the external sensor 6 includes the plurality of sensors (for example, the front camera 6c, the back camera 6d, the front LiDAR 6f, the back LiDAR 6b, the left LiDAR 6l, and the right LiDAR 6r). The cleaner control unit 2116 cleans at least one sensor among the plurality of sensors by the cleaner unit 110 based on the dirt signal, and determines whether or not the at least one sensor is in the clean state in a case where the cleaning of the at least one sensor by the cleaner unit 110 satisfies the predetermined condition. Further, the cleaner control unit 2116 is configured to, when it is determined that the at least one sensor is not in the clean state, generates the non-cleaning signal (second non-cleaning signal) indicating that the at least one sensor is not in the clean state, and output the non-cleaning signal to the vehicle control unit 3. This makes it possible for the vehicle control unit 3 to easily recognize which external sensor 6 out of the plurality of external sensors 6 is in the clean state, and only the external sensor 6 can be cleaned again. Therefore, the external sensor 6 in the clean state is not excessively cleaned, and the wear of the cleaner unit 110 and the consumption of the cleaning liquid can be suppressed.

Various Modifications

Although the embodiment of the present invention has been described above, it is needless to say that the technical scope of the present invention should not be limitedly interpreted by the description of the embodiments. It is to be understood by those skilled in the art that various embodiments are merely examples and various modifications can be made within the scope of the invention described in the claims. The technical scope of the present invention should be determined based on the scope of the invention described in claims and an equivalent scope thereof.

Although the configuration in which the above-described cleaner system 100 includes the external sensor 6 has been described, the cleaner system 100 may be configured not to include the external sensor 6. However, it is preferable that the cleaner system 100 is configured as an assembly including the external sensor 6 because positioning accuracy of the cleaners 103 to 106, 109a and 109b with respect to the external sensor 6 can be easily increased. In addition, since the external sensors 6 can also be incorporated together when the cleaner system 100 is mounted on the vehicle 1, the ease of assembly to the vehicle also enhanced.

In the above description, as a cleaner for cleaning the external sensor 6, the cleaners 103 to 106 for cleaning the LiDARs 6f, 6b, 6r, and 6l, the cleaner 109a for cleaning the front camera 6c, and the cleaner 109b for cleaning the back camera 6d have been described, but the present invention is not limited thereto. The cleaner system 100 may include a cleaner for cleaning a radar, or the like, instead of the sensor cleaners 103 to 106, 109a, and 109b, or may include the cleaner with the sensor cleaners 103 to 106, 109a, and 109b.

Note that the external sensor 6 such as the LiDARs 6f, 6b, 6r, and 6l may have a detection surface and a cover that covers the detection surface. The cleaner for cleaning the external sensor 6 may be configured to clean the detection surface, or may be configured to clean the cover that covers the sensor.

The cleaning liquid discharged by the cleaner system 100 includes water or a detergent. The cleaning mediums to be discharged to the front and rear windows 1f, 1b, the headlamps 7r, 7l, the LiDARs 6f, 6b, 6r, 6l, and the cameras 6c, 6d may be different or may be the same.

Although the example in which the cleaners 101, 103, 105 to 109b are connected to the front tank 111 and the cleaners 102, 104 are connected to the back tank 113 has been described above, the present invention is not limited thereto.

The cleaners 101 to 109b may be connected to a single tank. The cleaners 101 to 109b may be connected to tanks different from each other.

Alternatively, the cleaners 101 to 109l) may be connected to a common tank for each type of an object to be cleaned thereof. For example, the LCs 103 to 106 may be connected to a common first tank, and the HCs 107, 108 may be connected to a second tank different from the first tank.

Alternatively, the cleaners 101 to 109b may be connected to a common tank for each arrangement position of the object to be cleaned. For example, the front WW 101, the front LC 103, and the front camera cleaner 109a may be connected to a common front tank, the right LC 105 and the right HC 107 may be connected to a common right tank, the back WW 102, the back WW 104, the back camera cleaner 109b may be connected to a common back tank, and the left LC 106 and the left HC 108 may be connected to a common left tank.

Although an example in which the cleaning medium is discharged from the cleaners 101 to 109b by operating the actuators provided in the cleaners 101 to 109b has been described above, the present invention is not limited thereto.

Each of the cleaners 101 to 109b is provided with a normally closed valve, the pump is operated such that a pressure between the tank and each of the cleaners 101 to 109b is always high. The cleaner control unit 116 may open the valves provided in the cleaners 101 to 109b to discharge the cleaning mediums from the cleaners 101 to 109b.

Alternatively, each of the cleaners 101 to 109b is connected to an individual pump, and the cleaner control unit 116 may control each pump individually to control the discharge of the cleaning mediums from the cleaners 101 to 109b. In this case, each of the cleaners 101 to 109b may be connected to different tanks, or may be connected to a common tank.

The cleaners 101 to 109b are provided with one or more discharge holes for discharging the cleaning medium. The cleaners 101 to 109b may be provided with one or more discharge holes for discharging the cleaning liquid and one or more discharge holes for discharging air.

Each of the cleaners 101 to 109b may be individually provided, or the plurality of the cleaners 101 to 109b may be formed as a unit. For example, the right LC 105 and the right HC 107 may be configured as a single unit. In contrast to an aspect in which the right headlamp 7r and the right LiDAR 6r are integrated, the right LC 105 and the right HC 107 may be configured as a single unit.

The present application is based on a Japanese Patent Application No. 2018-41032 filed on Mar. 7, 2018, a Japanese Patent Application No. 2018-41036 filed on Mar. 7, 2018, a Japanese Patent Application No. 2018-41037 filed on Mar. 7, 2018, and a Japanese Patent Application No. 2018-41038 filed on Mar. 7, 2018, the contents of which are incorporated herein by reference.

The invention claimed is:

1. A vehicle cleaner system comprising:
a cleaner mounted on a vehicle and configured to clean an external sensor acquiring information outside of the vehicle by discharging a cleaning medium; and
at least one processor configured
to make a determination as to whether or not the vehicle has arrived within a predetermined distance from an entrance of an expressway and make a determination that the vehicle will enter the entrance of the expressway;
and to trigger the cleaner to clean the external sensor or to make a diagnosis of whether or not the external sensor needs to be cleaned by the cleaner in response to a result of the determination showing that the vehicle has arrived within the predetermined distance and the vehicle will enter the entrance of the expressway.

2. The vehicle cleaner system according to claim 1, wherein the cleaner includes
a nozzle configured to discharge the cleaning medium toward the external sensor, and
a dirt sensor configured to detect dirt on the external sensor, and
wherein the at least one processor is configured
to make the diagnosis of whether or not the external sensor needs to be cleaned based on output from the dirt sensor in response to the result of the determination showing that the vehicle has arrived within the predetermined distance; and
to cause the nozzle to discharge the cleaning medium toward the external sensor in response to a result of the diagnosis showing that the external sensor needs to be cleaned.

3. The vehicle cleaner system according to claim 1, wherein the cleaner includes
a liquid nozzle configured to discharge a cleaning liquid toward the external sensor,
an air nozzle configured to discharge air toward the external sensor, and
a dirt sensor configured to detect dirt on the external sensor, and
wherein the at least one processor is configured
to make the diagnosis of whether or not the external sensor needs to be cleaned based on output from the dirt sensor in response to the result of the determination showing that the vehicle has arrived within the predetermined distance;
to cause the nozzle to discharge the cleaning medium to the external sensor and the air nozzle to discharge the air toward the external sensor in response to a result of the diagnosis showing that the external sensor needs to be cleaned; and
to cause the air nozzle to discharge the air toward the external sensor but not to cause the nozzle to discharge the cleaning medium toward the external sensor in response to the result of the diagnosis showing that the external sensor does not need to be cleaned.

4. The vehicle cleaner system according to claim 1,
wherein the at least one processor is configured
- to acquire weather information to make a determination as to whether or not the weather information indicates a weather condition in which the cleaner is to be operated in response to the result of the determination showing that the vehicle has arrived within the predetermined distance; and
- to trigger the cleaner to clean the external sensor in response to a result of the determination showing that the weather information indicates the weather condition in which the cleaner is to be operated.

5. The vehicle cleaner system according to claim 4,
wherein the weather condition in which the cleaner is to be operated is rain.

6. The vehicle cleaner system according to claim 1,
wherein the at least one processor is configured to make the determination as to whether or not the vehicle has arrived within the predetermined distance based on strength of a wireless signal emitted from a transmitter installed at the entrance of the expressway.

\* \* \* \* \*